United States Patent
Inoue

(10) Patent No.: US 10,260,649 B2
(45) Date of Patent: Apr. 16, 2019

(54) FLUIDIC DEVICE

(71) Applicant: Surpass Industry Co., Ltd., Gyoda-shi, Saitama (JP)

(72) Inventor: Atsushi Inoue, Gyoda-shi, Saitama (JP)

(73) Assignee: Surpass Industry Co., Ltd., Gyoda-shi, Saitama (JP)

( * ) Notice: Subject to any disclaimer, the term of this patent is extended or adjusted under 35 U.S.C. 154(b) by 0 days.

(21) Appl. No.: 15/163,714

(22) Filed: May 25, 2016

(65) Prior Publication Data

US 2016/0356388 A1    Dec. 8, 2016

(30) Foreign Application Priority Data

Jun. 4, 2015  (JP) .................................. 2015-114088

(51) Int. Cl.
*F16K 11/20* (2006.01)
*F16K 27/00* (2006.01)
*B24B 57/02* (2006.01)

(52) U.S. Cl.
CPC .............. *F16K 11/20* (2013.01); *B24B 57/02* (2013.01); *F16K 27/003* (2013.01)

(58) Field of Classification Search
CPC ....... Y10T 137/87885; Y10T 137/5109; Y10T 137/5283; F16K 27/003; F16K 11/20; B24B 57/02; F15B 13/0817; F15B 13/0821; F15B 13/0825
USPC ........................ 137/884, 269, 271; 285/124.5
See application file for complete search history.

(56) References Cited

U.S. PATENT DOCUMENTS

| | | | |
|---|---|---|---|
| 5,275,201 A | 1/1994 | Zimmerly | |
| 6,192,932 B1 * | 2/2001 | Izumo | F16K 11/20 137/606 |
| 8,522,825 B2 | 9/2013 | Igarashi | |
| 2004/0112446 A1 | 6/2004 | Eidsmore et al. | |
| 2006/0060253 A1 | 3/2006 | Yoshida et al. | |
| 2010/0163125 A1 | 7/2010 | Igarashi | |
| 2011/0114198 A1 | 5/2011 | Burmester et al. | |

(Continued)

FOREIGN PATENT DOCUMENTS

| | | |
|---|---|---|
| DE | 10 2008 026 149 A1 | 12/2009 |
| DE | 10 2010 022 624 A1 | 12/2011 |

(Continued)

OTHER PUBLICATIONS

Extended European Search Report for European Application No. 16172133.7 dated Oct. 17, 2016.

(Continued)

*Primary Examiner* — Michael R Reid
(74) *Attorney, Agent, or Firm* — Muncy, Geissler, Olds & Lowe, P.C.

(57) ABSTRACT

Provided is a fluidic device including a first fluid unit having a plurality of first passages for passing fluids along a first direction, a second fluid unit having a plurality of second passages for passing the fluids along a second direction intersecting the first direction, and a plurality of on/off valves placed at a plurality of points, one at each point, where the first passages and the second passages intersect with each other. The first fluid unit and the second fluid unit are arranged such that outlets formed at a plurality of locations of the first passages are coupled to inlets formed at a plurality of locations of the second passages at each of the points.

6 Claims, 17 Drawing Sheets

(56) References Cited

U.S. PATENT DOCUMENTS

2012/0222750 A1    9/2012  Wong et al.
2013/0087230 A1*   4/2013  Yasuda ................ G05D 7/0635
                                                          137/597

FOREIGN PATENT DOCUMENTS

| EP | 1 284 371 A1 | 2/2003 |
| JP | H07119855 A | 5/1995 |
| JP | H10292871 A | 11/1998 |
| JP | H11257533 A | 9/1999 |
| JP | 2003526759 A | 9/2003 |
| JP | 2006046494 A | 2/2006 |
| JP | 2008-291941 A | 12/2008 |
| JP | 2008291942 A | 12/2008 |
| JP | 2013080424 A | 5/2013 |
| WO | WO2004036099 A1 | 2/2006 |

OTHER PUBLICATIONS

Japanese Office Action dated Mar. 5, 2019 in corresponding application 2015-114088.

* cited by examiner

FLUIDIC DEVICE

CROSS-REFERENCE TO RELATED APPLICATIONS

This application is based on Japanese Patent Application No. 2015-114088, the contents of which are incorporated herein by reference in its entirety.

TECHNICAL FIELD

The present disclosure relates to a fluidic device.

BACKGROUND ART

There is a fluidic device known in the art that can supply a fluid, such as a chemical solution or pure water used for a semiconductor manufacturing apparatus, to each of a plurality of destinations separately (refer to Japanese Unexamined Patent Application, Publication No. 2008-291941, for example).

A fluidic device disclosed in Japanese Unexamined Patent Application, Publication No. 2008-291941 has two link passages that introduces a chemical solution from a chemical solution passage for circulating a chemical solution into two chemical solution discharge passages. The fluidic device disclosed in Japanese Unexamined Patent Application, Publication No. 2008-291941 is provided with a control valve at each inlet opening from the chemical solution passage to the two link passages. The flow state of the chemical solution from the chemical solution passage to the link passages is switched by switching the control valves between open and closed states.

The fluidic device disclosed in Japanese Unexamined Patent Application, Publication No. 2008-291941 is also provide with a control valve provided at each inlet opening from an ultrapure water passage for circulating ultrapure water to the two link passages. The flow state of the ultrapure water from the ultrapure water passage to the link passages is switched by switching the control valves between open and closed states.

In this way, the fluidic device disclosed in Japanese Unexamined Patent Application, Publication No. 2008-291941 supplies either the chemical solution from the chemical solution passage or the ultrapure water from the ultrapure water passage to each of the two chemical solution discharge passages by switching the control valves between open and closed states.

SUMMARY

Technical Problem

The fluidic device disclosed in Japanese Unexamined Patent Application, Publication No. 2008-291941 has inside of a single base member the chemical solution passage, the ultrapure water passage, and the link passages linking the passages to the two chemical solution discharge passages. Accordingly, the single base member needs to be replaced in its entirety including the link passages in replacing the chemical solution passage when portion of the chemical solution (e.g., abrasive grains contained in slurry) coagulates in the chemical solution passage or in replacing the ultrapure water passage.

When the base member is replaced in its entirety including the link passages, all the control valves and all pipes attached to the base member need to be removed from the base member, thereby requiring intensive labor in the replacement work. Also, even if the link passage portion of the base member does not need to be replaced, the single base member needs to be replaced in its entirety, thereby increasing costs for the replacement.

The present disclosure has been made in view of the above circumstances and aims to provide a fluidic device supplying fluids from a plurality of supply sources to a plurality of destinations that allows a unit having passages for passing fluid supplied from the plurality of supply sources and a unit having passages for supplying the fluid to the plurality of destinations to be replaced separately to thereby reduce the labor and the costs for the replacement.

Solution to Problem

In order to solve the foregoing problem, the following solutions have been adopted in the present disclosure.

A fluidic device according to an aspect of the present disclosure includes a first fluid unit having a plurality of first passages for passing fluids from a plurality of supply sources each along a first direction, a second fluid unit having a plurality of second passages for passing the fluids along a second direction intersecting the first direction and supplying the fluids to a plurality of destinations, and a plurality of on/off valves placed at a plurality of intersecting points, one at each intersecting point, where the first passages and the second passages intersect with each other, the on/off valves switching flow states of the fluids from the first passages to the second passages. The first fluid unit and the second fluid unit are removably coupled to each other such that outlets formed at a plurality of locations of the first passages are coupled to inlets formed at a plurality of locations of the second passages at each of the intersecting points.

According to a fluidic device in accordance with an aspect of the present disclosure, the on/off valves placed at the plurality of intersecting points where the first passages of the first fluid unit intersect with the second passages of the second fluid unit each switch the flow state of the fluid from the first passage to the second passage at the intersecting point.

Thus, a desired one of the fluids from the plurality of supply sources can be supplied to each of the plurality of destinations by appropriately switching the on/off valves between open and closed states.

The first fluid unit for passing the fluids from the plurality of supply sources is separate from the second fluid unit for supplying the fluids to the plurality of destinations, and these units are removably coupled to each other.

When either one of the first fluid unit or the second fluid unit needs to be replaced, therefore, only one fluid unit that needs to be replaced can be replaced while using the other fluid unit without replacement. Moreover, in replacing the one fluid unit, piping and other components attached to the other fluid unit that is not replaced is not required to be removed.

Thus, according to a fluidic device in accordance with an aspect of the present disclosure, in a fluidic device that supplies fluid from a plurality of supply sources to a plurality of destinations, a unit having passages for passing the fluids from the plurality of supply sources and a unit having passages for supplying the fluids to the plurality of destinations can be replaced separately, thereby reducing the labor and the costs for the replacement.

A fluidic device according to an aspect of the present disclosure may be configured such that the first fluid unit includes a plurality of first passage members each having one of the first passages, and the second fluid unit includes a plurality of second passage members each having one of the second passages.

According to the configuration, the first passage member including one of the plurality of first passages of the first fluid unit that needs to be replaced may be replaced alone, while using the other first passage members without replacement. Similarly, the second passage member including one of the plurality of second passages of the second fluid unit that needs to be replaced may be replaced alone, while using the other second passage members without replacement.

This makes it possible for the one passage member including the passage that needs to be replaced to be replaced alone, thereby further reducing the labor and the costs for the replacement.

The fluidic device with the above configuration may further include an assembly including an annular shaped annular portion and a plurality of nut portions spaced along a circumferential direction of the annular portion and may be formed such that the plurality of nut portions are inserted into insertion holes opening on an upper surface or a lower surface of the corresponding second passage member, a plurality of first fastening bolts are fastened to one end sides of the nut portions, the first fastening bolts being inserted through through holes formed at each of the corresponding first passage member and the corresponding second passage member, and a plurality of second fastening bolts are fastened to the other end sides of the nut portions, the second fastening bolts being inserted through through holes formed at each of the corresponding on/off valve and the corresponding second passage member.

According to the fluidic device of this form, the fastening force between the plurality of nut portions and the first fastening bolts is transferred to adjacent members via the annular portion, and the fastening force between the plurality of nut portions and the second fastening bolts is transferred to adjacent members via the annular portion.

The annular portion is in contact with the upper or lower surface of the second passage member for the entire circumference of the annular portion, so that this suppresses an occurrence of a strain at the members adjacent to the annular portion even if there are differences among the fastening force between the plural pairs of the nut portion and the first fastening bolt or between the plural pairs of the nut portion and the second fastening bolt.

This increases both the sealing performance at the coupling position of the first passage members and the second passage members, and also the sealing performance at the coupling position of the second passage members and the on/off valves.

The fluidic device with the above configuration may further include a plurality of pressure sensors respectively mounted on destination side end portions of the plurality of second passage members, one on each destination side end portion, the pressure sensors each detecting a pressure of a fluid supplied from the corresponding second passage to the corresponding destination.

With this configuration, pressures of the fluids supplied through the plurality of second passages to the destinations can be detected by the respective pressure sensors.

Advantageous Effects

According to the present disclosure, there is provided a fluidic device supplying fluids from a plurality of supply sources to a plurality of destinations that allows a unit having passages for passing fluids supplied from the plurality of supply sources and a unit having passages for supplying the fluids to the plurality of destinations to be replaced separately to thereby reduce the labor and the costs of the replacement.

DESCRIPTION OF EMBODIMENTS

Hereinafter, a fluidic device 100 according to an embodiment of the present disclosure will be described based on the drawings.

Figure 1:
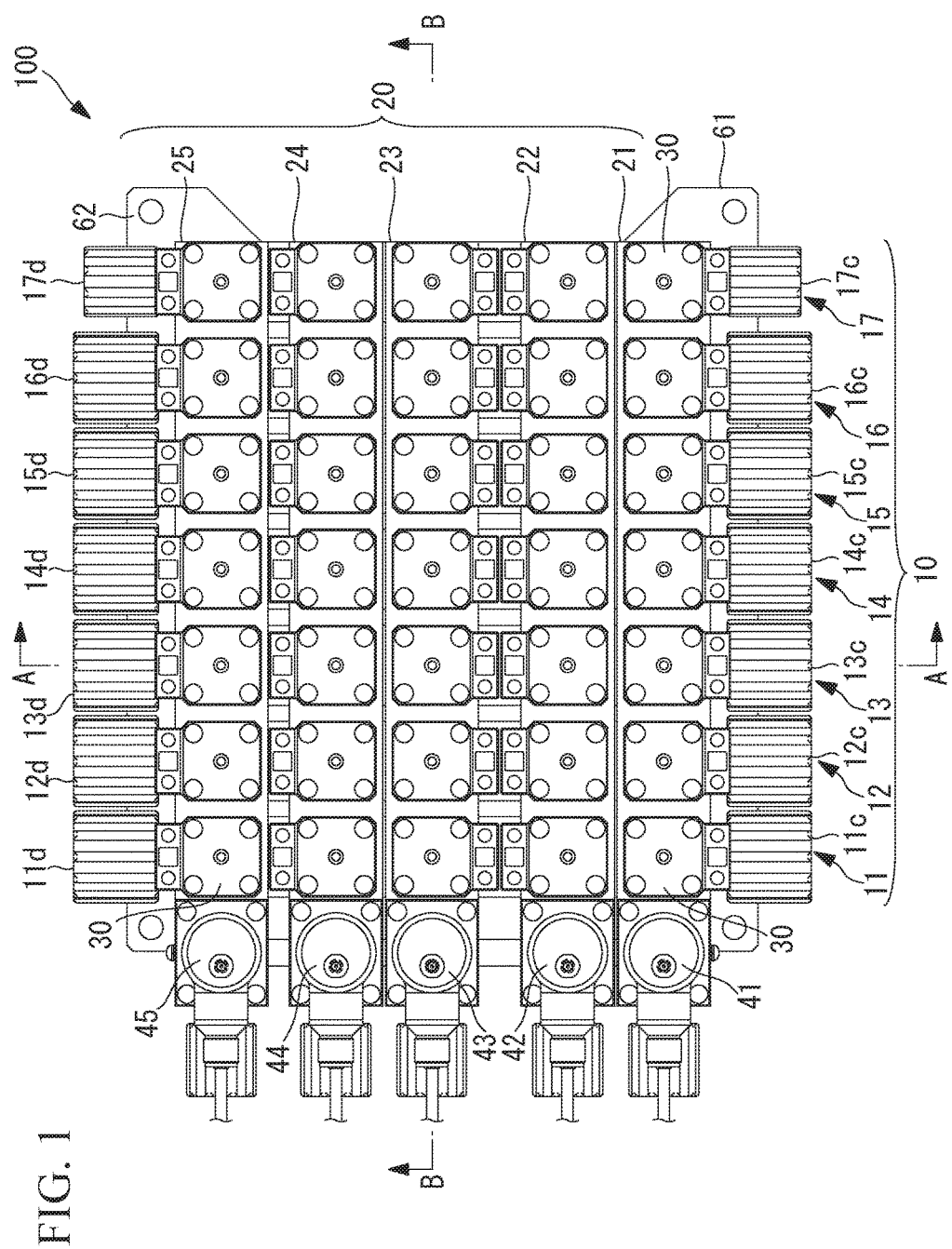
FIG. 1 is a top view of a fluidic device according to the embodiment.

The fluidic device 100 in FIG. 1 can supply a desired fluid out of fluids (pure water or chemical solution like hydrofluoric acid) from a plurality of supply sources selectively to a plurality of destinations.

As shown in a top view of FIG. 1, the fluidic device 100 includes a first fluid unit 10 having first passage members 11 to 16 to which fluids from a plurality of supply sources (IN1 to IN6 shown in FIG. 2) are supplied, a second fluid unit 20 having second passage members 21 to 25 that supply the fluids to a plurality of destinations (OUT1 to OUT5 shown in FIG. 2), a plurality of on/off valves 30, a plurality of pressure sensors 41 to 45 respectively attached to destination side end portions of the second passage members 21 to 25, and a controller 50 (refer to FIG. 3) that controls open and closed states of the plurality of on/off valves 30.

The first fluid unit 10 includes a drain passage member 17 whose drain port 17c and 17d are each connected to a vacuum source (not shown). The vacuum source may be an aspirator, for example.

Figure 2:
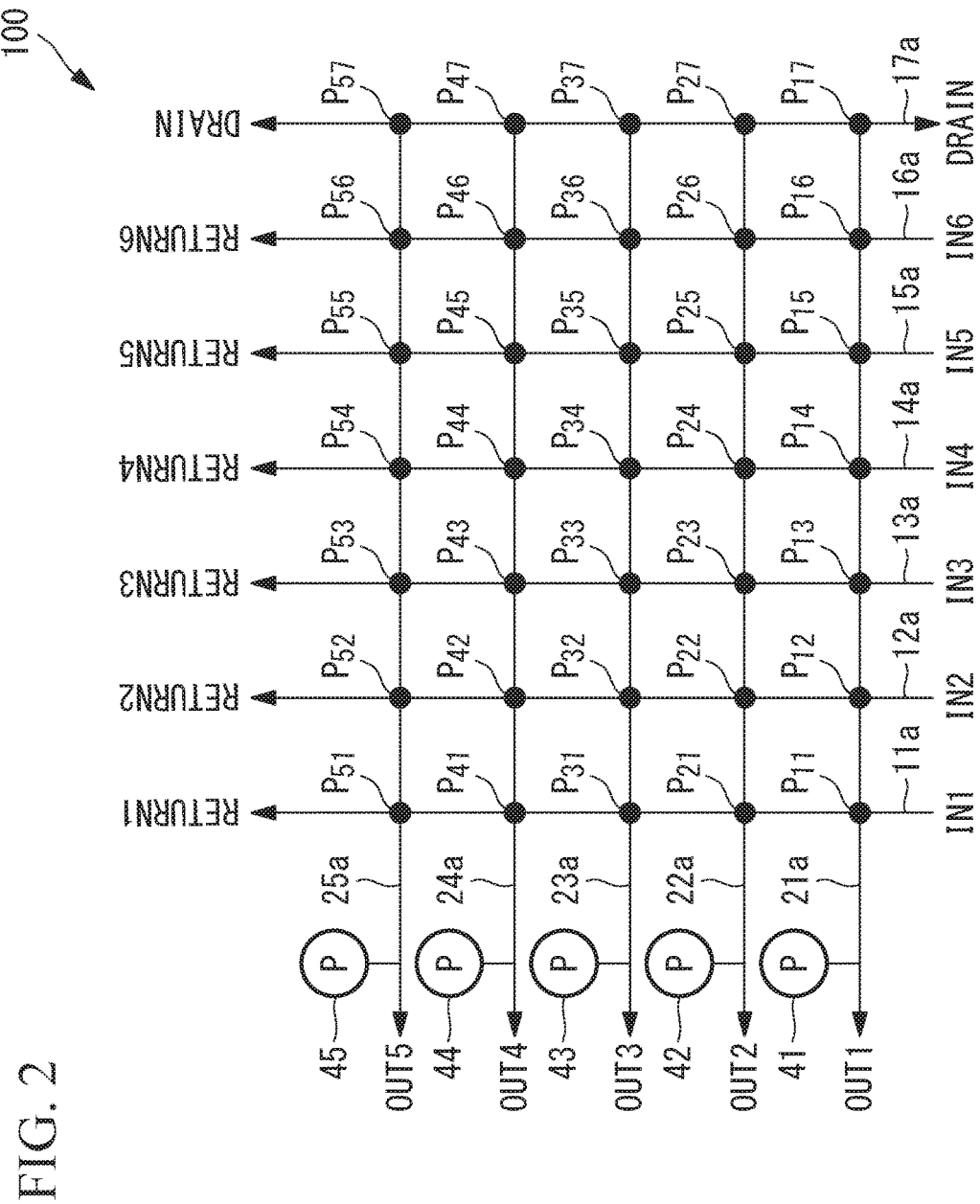
FIG. 2 shows a general configuration of the fluidic device shown in FIG. 1.

FIG. 2 schematically shows a general configuration of the fluidic device 100 in FIG. 1. FIG. 2 schematically shows the arrangement of first passages 11a to 16a respectively included in the first passage members 11 to 16 of the first fluid unit 10, a drain passage 17a included in the drain passage member 17 of the first fluid unit 10, and second passages 21a to 25a respectively included in the second passage members 21 to 25 of the second fluid unit 20, as seen from the top side of the fluidic device 100 in FIG. 1.

The plurality of first passage members 11 to 16 in FIG. 1 each include the corresponding one of the first passages 11a to 16a. The plurality of second passage members 21 to 25 each include the corresponding one of the second passages 21a to 25a. The first passage members 11 to 16 and the second passage members 21 to 25 are made of a fluorocarbon resin (e.g., polytetrafluoroethylene (PTFE)).

As shown in FIGS. 1 and 2, the plurality of first passages 11a to 16a respectively pass the fluids supplied by the plurality of supply sources IN1 to IN6 along a first direction (the up-down direction in FIGS. 1 and 2) from inlet portions 11c to 16c toward outlet portions 11d to 16d.

The fluids supplied from the supply sources IN1 to IN6 are discharged from the first passages 11a to 16a to be supplied to a plurality of circulation passages RETURN1 to RETURN6, respectively. The circulation passages RETURN1 to RETURN6 return the fluids into the respective supply sources IN1 to IN6. The fluids returned to the plurality of supply sources IN1 to IN6 are guided into the first passages 11a to 16a again.

In this way, the fluids are circulating in the first passages 11a to 16a through the circulation passages RETURN1 to RETURN6 all the time. Accordingly, portions of the fluid (e.g., abrasive grains contained in slurry) hardly coagulate inside the first passages 11a to 16a.

As shown in FIG. 2, the plurality of second passages 21a to 25a pass fluids along a second direction (the left-right direction in FIG. 2) orthogonal to the first direction to supply the fluids to the plurality of destinations OUT1 to OUT5.

While in FIG. 2 the first direction in which the first passages 11a to 16a pass the fluids is orthogonal to the second direction in which the second passages 21a to 25a pass the fluids, these directions need not be orthogonal to each other as long as they intersect.

As shown in FIG. 2, the first passage 11a of the first passage member 11 is arranged to intersect each of the second passages 21a to 25a of the second passage members 21 to 25 at five locations of points $P_{11}$, $P_{21}$, $P_{31}$, $P_{41}$, and $P_{51}$. Similarly, the first passages 12a to 16a are arranged to intersect each of the second passages 21a to 25a at five locations of points $P_{12}$ to $P_{52}$, points $P_{13}$ to $P_{53}$, points $P_{14}$ to $P_{54}$, points $P_{15}$ to $P_{55}$, and points $P_{16}$ to $P_{56}$, respectively.

Also, the drain passage 17a of the drain passage member 17 is arranged to intersect each of the second passages 21a to 25a of the second passage members 21 to 25 at five locations of points $P_{17}$, $P_{27}$, $P_{37}$, $P_{47}$, and $P_{57}$.

The drain passage 17a is provided for discharging the fluids remaining inside the second passages 21a to 25a to the outside through the drain ports 17c and 17d by the action of the vacuum source (not shown) communicating with the drain ports 17c and 17d.

The on/off valves 30 are arranged at a total of 35 locations, the points $P_{11}$ to $P_{51}$, the points $P_{12}$ to $P_{52}$, the points $P_{13}$ to $P_{53}$, the points $P_{14}$ to $P_{54}$, the points $P_{15}$ to $P_{55}$, the points $P_{16}$ to $P_{56}$, and the points $P_{17}$ to $P_{57}$ in FIG. 2.

The on/off valves 30 arranged at the points other than the points $P_{17}$ to $P_{57}$ each switches between inflow state where the fluid is allowed at the point to enter the second passage 21a to 25a from the first passage 11a to 16a and shut-off state where the fluid is not allowed at the point to enter the second passage 21a to 25a from the first passage 11a to 16a.

The other on/off valves 30 arranged at the points $P_{17}$ to $P_{57}$ each switches between discharge state where the fluid is at the point discharged from the second passage 21a to 25a to the drain passage 17a communicating with the vacuum source (not shown) and shut-off state where the fluid is at the point not discharged from the second passage 21a to 25a to the drain passage 17a.

Figure 3:
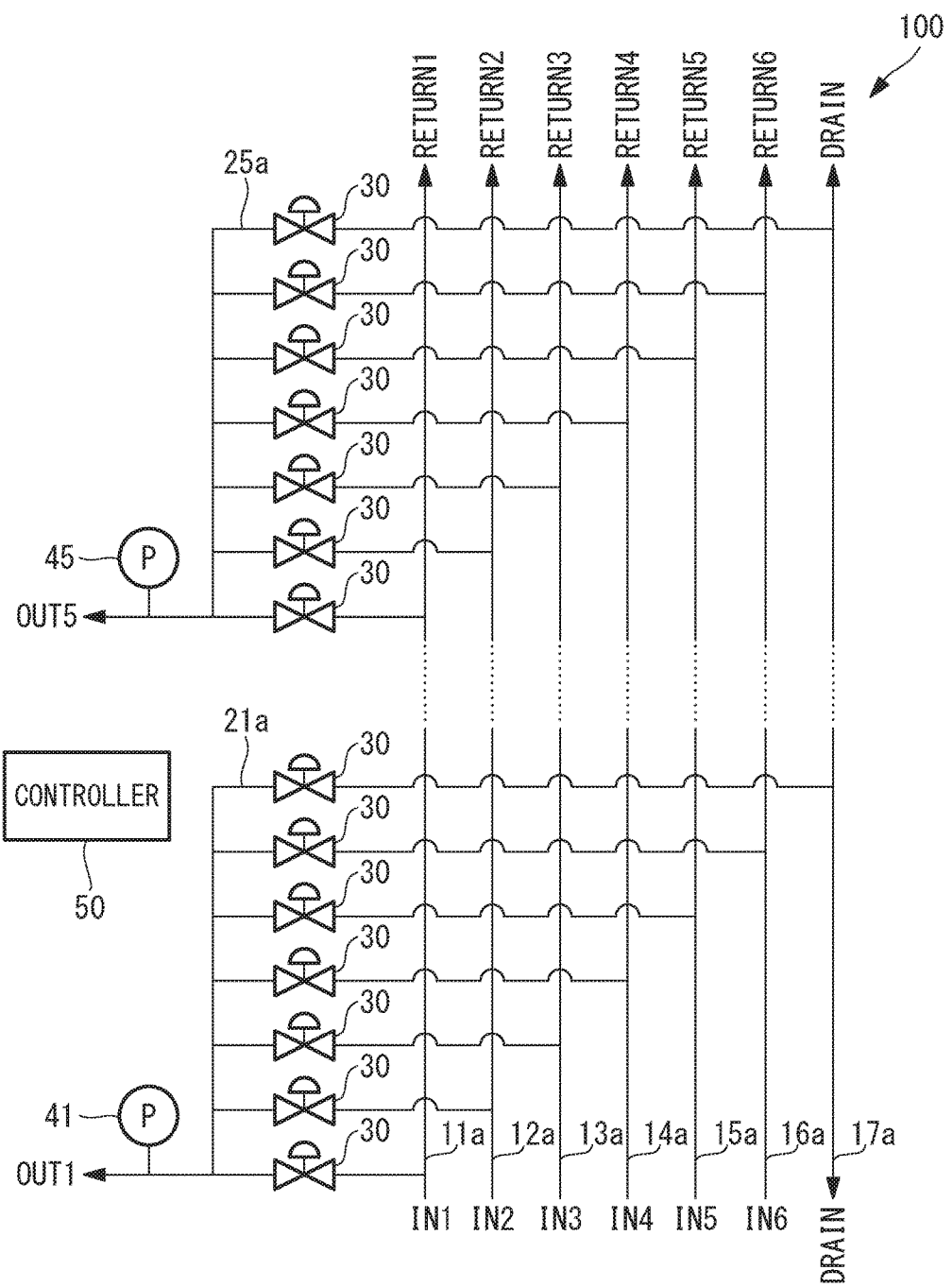
FIG. 3 shows a passage system of the fluidic device shown in FIG. 1.

Next, a passage system of the fluidic device 100 of the embodiment will be described using FIG. 3. FIG. 3 schematically shows the passage system configured to include the first passages 11a to 16a, the second passages 21a to 25a, the on/off valves 30, and the pressure sensors 41 to 45.

As shown in FIG. 3, the on/off valve 30 is arranged between each first passage 11a to 16a and the second passage 21a.

The controller 50 of the fluidic device 100 opens either one of the five on/off valves 30 arranged between the first passages 11a to 16a and the second passage 21a while closing the other on/off valves 30, thereby supplying a fluid from either one of the first passages 11a to 16a to the second passage 21a.

Similarly, the controller 50 of the fluidic device 100 opens either one of the five on/off valves 30 arranged between the first passages 11a to 16a and the second passage 25a while closing the other on/off valves 30, thereby supplying a fluid from either one of the first passages 11a to 16a to the second passage 25a.

The controller 50 also opens either one of the five on/off valves 30 arranged between the first passages 11a to 16a and each second passage 22a to 24a (not shown) while closing the other on/off valves 30, thereby supplying a fluid from either one of the first passages 11a to 16a to the second passage 22a to 24a.

The controller 50 opens each on/off valve 30 by controlling compressed air to be supplied to the on/off valve 30 from a compressed air source (not shown) and closes each on/off valve 30 by controlling the compressed air not to be supplied from the compressed air source (not shown) to the on/off valve 30.

Next, a description will be given, using FIG. 4, to a structure for mounting the fluidic device 100 of the embodiment onto an installation surface S.

Figure 4:
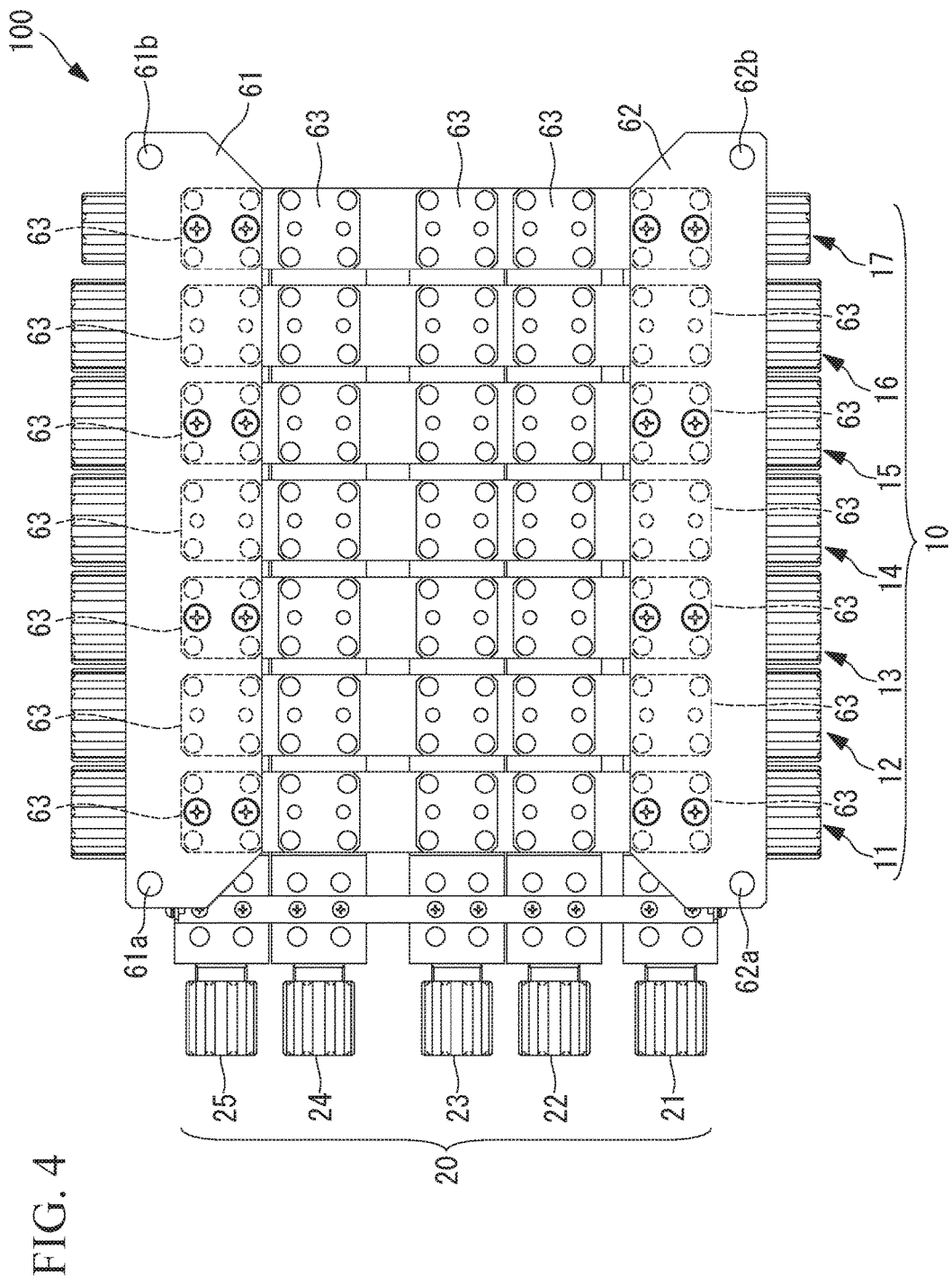
FIG. 4 is a bottom view of the fluidic device shown in FIG. 1.

As shown in a bottom view of FIG. 4, the fluidic device 100 has attached to the undersurface thereof a pair of first base members 61 and 62 for mounting the fluidic device 100 onto the installation surface S.

The first base member 61 has fastening holes 61a and 61b and is fixed to the installation surface S as fastening bolts (not shown) are inserted into the fastening holes 61a and 61b and fastened to fastening holes (not shown) of the installation surface S. Similarly, the first base member 62 has fastening holes 62a and 62b and is fixed to the installation surface S as fastening bolts (not shown) are inserted into the fastening holes 62a and 62b and fastened to fastening holes (not shown) of the installation surface S.

Figure 5:
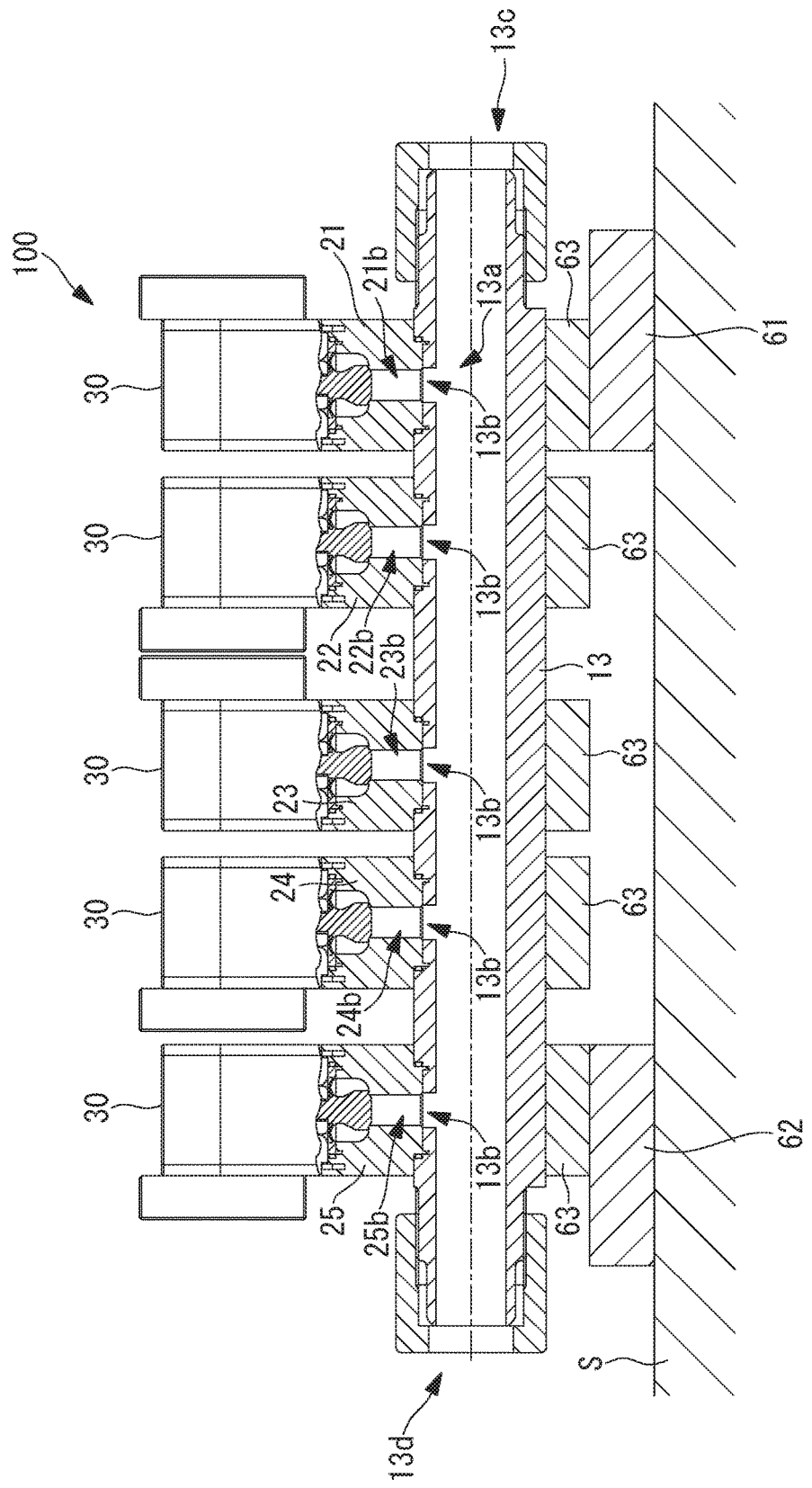
FIG. 5 is a partial cross-sectional view of the fluidic device shown in FIG. 1 taken along the line A-A.

As shown in FIG. 4 and FIG. 5 (a partial cross-sectional view of the fluidic device shown in FIG. 1 taken along the line A-A), second base members 63 are fixed to the pair of first base members 61 and 62 by fastening bolts at the points where the first passage members 11, 13, and 15, and the drain passage member 17 are arranged.

The second base members 63 are attached to the second passage members 21 to 25 with the first passage members 11 to 16 and the drain passage member 17 interposed between the on/off valves 30 and the second base members 63 as will be described later.

As shown in FIG. 4, because the second base members 63 are fixed to the pair of first base members 61 and 62, the first passage members 11, 13, and 15, and the drain passage member 17 are fixed to the installation surface S via the second base members 63 and the pair of first base members 61 and 62.

On the other hand, the first passage members 12, 14, and 16 are not directly fixed to the pair of first base members 61 and 62, but attached to the second passage members 21 to 25 via the second base members 63.

Accordingly, the first passage members 12, 14, and 16 are fixed to the first passage members 11, 13, and 15, and the drain passage member 17 via the second passage members 21 to 25 and finally fixed to the installation surface S via the second base members 63 and the pair of first base members 61 and 62.

In this way, the first passage members 11 to 16, the drain passage member 17, and the second passage members 21 to 25 are each fixed to the installation surface S.

Next, a description will be given, using FIGS. 5 and 6, to a structure for connecting the first passage members 11 to 16 of the first fluid unit 10 and the second passage members 21 to 25 of the second fluid unit 20.

As shown in FIG. 5 (the partial cross-sectional view of the fluidic device shown in FIG. 1 taken along the line A-A), the first passage member 13 has inside the first passage 13a, and the first passage 13a has outlets 13b at a plurality of locations. The outlets 13b are formed at the points $P_{13}$ to $P_{53}$ in FIG. 2.

While FIG. 5 only shows the first passage member 13, the first passage members 11, 12, 14 to 16, and the drain passage member 17 each has a similar structure, too.

That is, the first passage members 11, 12, 14 to 16 respectively have inside the first passages 11a, 12a, 14a to 16a, and the first passages 11a, 12a, 14a to 16a respectively have outlets 11b, 12b, 14b, 15b, and 16b, at a plurality of locations. The outlets 11b, 12b, 14b, 15b, and 16b are respectively formed at the points $P_{11}$ to $P_{51}$, the points $P_{12}$ to $P_{52}$, the points $P_{14}$ to $P_{54}$, the points $P_{15}$ to $P_{55}$, and the points $P_{16}$ to $P_{56}$ in FIG. 2.

In addition, the drain passage member 17 has inside the drain passage 17a, and the drain passage 17a has drain openings 17b at a plurality of locations. The drain openings 17b are formed at the points $P_{17}$ to $P_{57}$ in FIG. 2.

Figure 6:
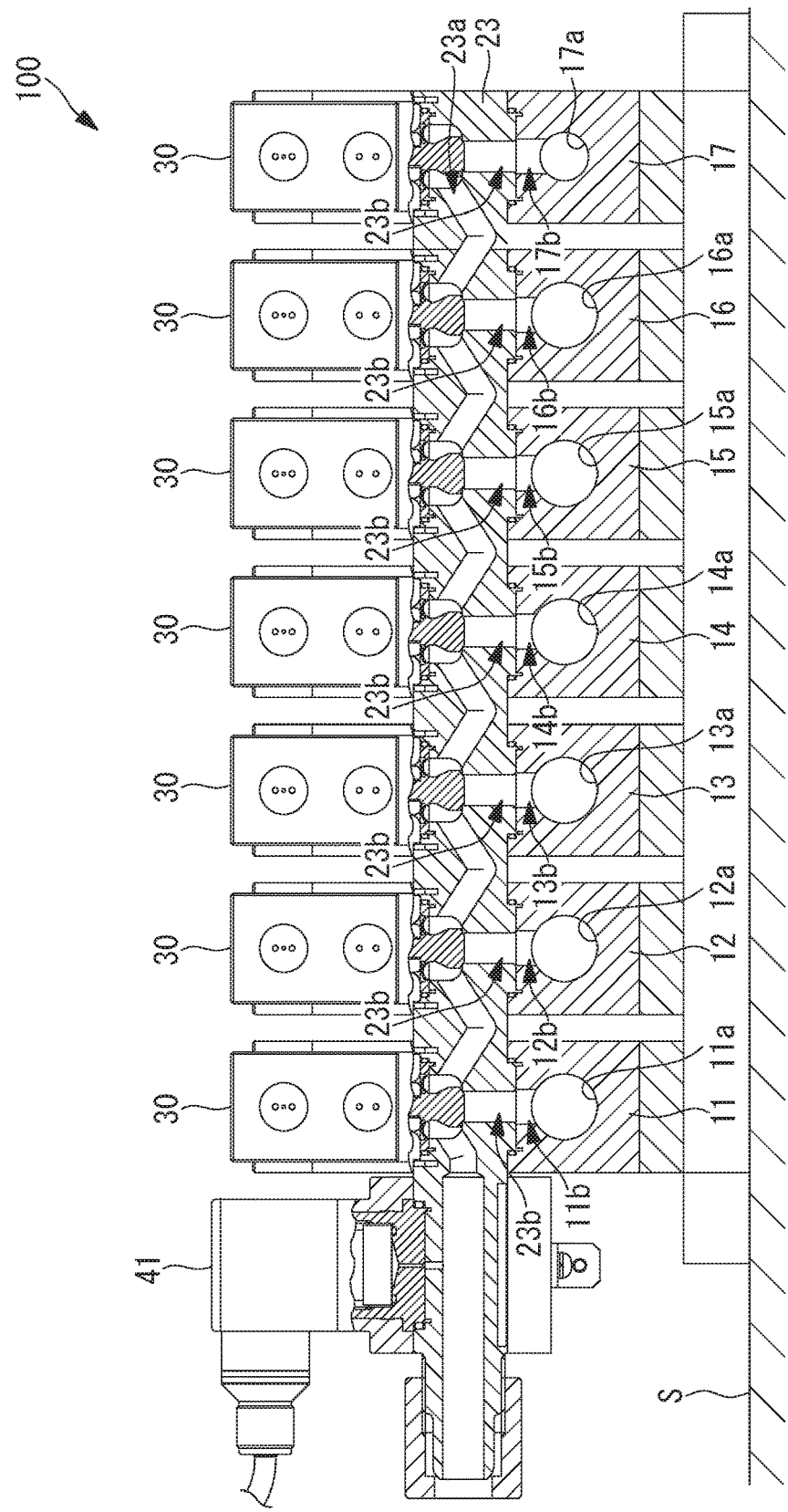
FIG. 6 is a partial cross-sectional view of the fluidic device shown in FIG. 1 taken along the line B-B.

As shown in FIG. 6, the drain passage 17a has a smaller flow path diameter than the first passages 11a to 16a. This is for enhancing the suction performance of the vacuum source (not shown) by reducing the flow path diameter of the drain passage 17a and thus its volume.

As shown in FIG. 6 (a partial cross-sectional view of the fluidic device shown in FIG. 1 taken along the line B-B), the second passage member 23 has inside the second passage 23a, and the second passage 23a has inlets 23b at a plurality of locations. The inlets 23b are formed at the points $P_{31}$ to $P_{37}$ in FIG. 2.

While FIG. 6 only shows the second passage member 23, the second passage members 21, 22, 24, and 25 each has a similar structure, too.

That is, the second passage members 21, 22, 24, and 25 respectively have inside the second passages 21a, 22a, 24a, and 25a, and the second passages 21a, 22a, 24a, and 25a respectively have outlets 21b, 22b, 24b, and 25b, at a plurality of locations. The outlets 21b, 22b, 24b, and 25b are respectively formed at the points $P_{11}$ to $P_{17}$, the points $P_{21}$ to $P_{27}$, the points $P_{41}$ to $P_{47}$, and the points $P_{51}$ to $P_{57}$ in FIG. 2.

In this way, the first fluid unit 10 and the second fluid unit 20 are arranged such that the outlets 11b to 16b formed at the plurality of locations in the first passages 11a to 16a and the inlets 21b to 25b formed at the plurality of locations in the second passage members 21 to 25 are coupled together at a total of 30 locations, the points $P_{11}$ to $P_{51}$, the points $P_{12}$ to $P_{52}$, the points $P_{13}$ to $P_{53}$, the points $P_{14}$ to $P_{54}$, the points $P_{15}$ to $P_{55}$, and the points $P_{16}$ to $P_{56}$. A plug portion of the on/off valve 30 is arranged at each point to close or open the inlets 21b to 25b.

Next, the on/off valves 30 will be described using FIGS. 7 to 9. While FIGS. 7 to 9 only show the on/off valve 30 arranged at the point $P_{11}$ in FIG. 2, the on/off valves 30 arranged at the other points each has a similar structure, too.

Figure 7:
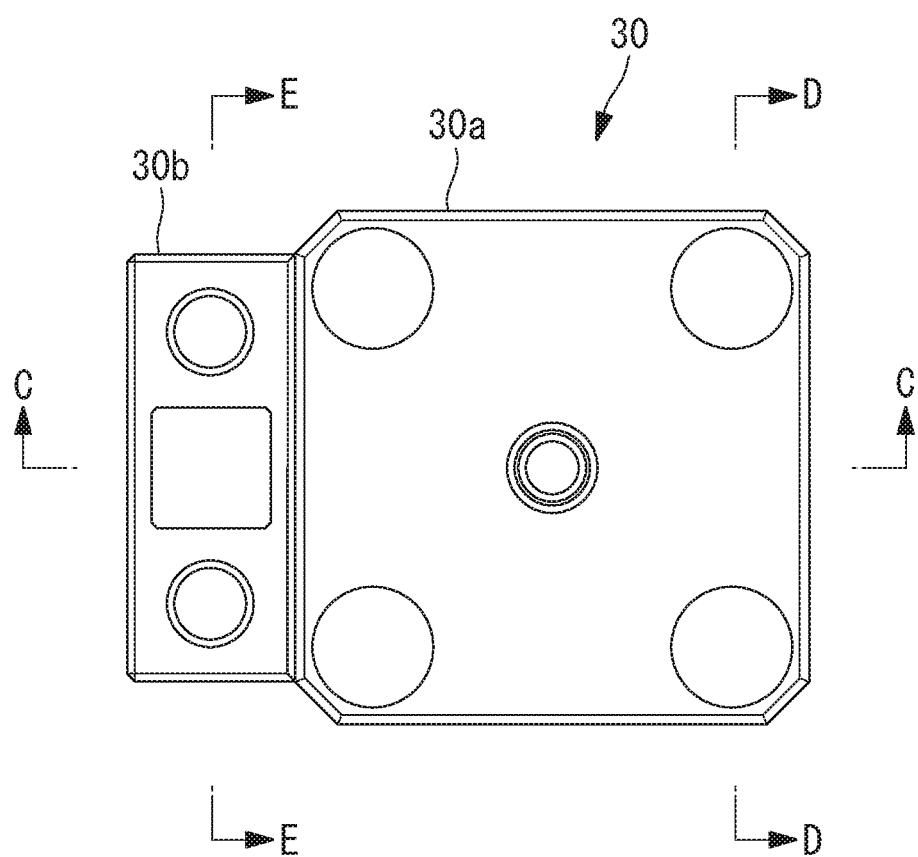
FIG. 7 is a top view of an on/off valve shown in FIG. 1.

As shown in FIG. 7, the on/off valve 30 has a main body portion 30a and an air port connection portion 30b. As shown in FIG. 8, the main body portion 30a includes a first body 31, a second body 32, a piston portion 33, a plug portion 34, and a spring portion 35.

Figure 8:
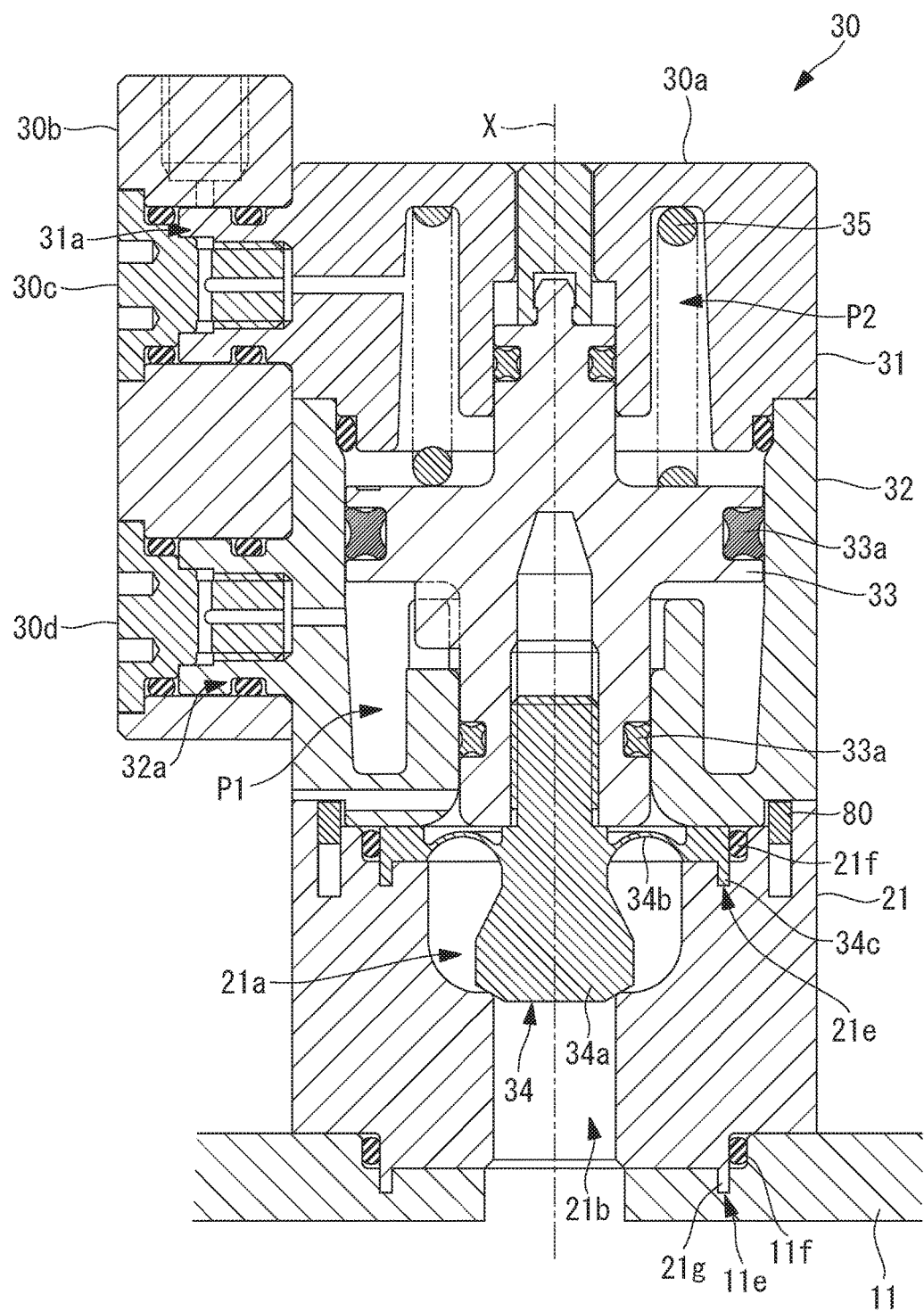
FIG. 8 is a cross-sectional view of the on/off valve shown in FIG. 7 taken along the line C-C.

As shown in FIG. 8 (a cross-sectional view of the on/off valve shown in FIG. 7 taken along the line C-C), the plug portion 34 moves vertically along an axis X to switch between the inflow state where the fluid enters the second passage 21a through the inlet 21b of the second passage member 21 communicating with the outlet 11b of the first passage 11a and the shut-off state where the fluid does not enter the second passage 21a through the inlet 21b. FIG. 8 shows the plug portion 34 brought into contact at its end with a valve seat formed at the inlet 21b of the second passage member 21, showing the shut-off state where the fluid does not enter the second passage 21a through the inlet 21b.

An upper end of the plug portion 34 is mounted to a lower end of the piston portion 33, so that the plug portion 34 and the piston portion 33 move together as a unit along the axis X.

As shown in FIG. 8, the piston portion 33 is accommodated in the second body 32. The piston portion 33 is movable along the axis X with its outer circumferential surface in contact with an inner circumferential surface of the second body 32. The piston portion 33 has endless X rings 33a extending around the axis X, at a plurality of locations on the outer circumferential surface. The X rings 33a are in contact with the inner circumferential surface of the second body 32, and thus this maintains the airtightness of a pressure chamber P1 formed between the piston portion 33 and the second body 32.

The spring portion 35 is placed inside the first body 31 and exerts a downward biasing force on the piston portion 33 along the axis X.

When the pressure chamber P1 is maintained at atmospheric pressure, the spring portion 35 exerts a biasing force on the piston portion 33 to bring the end of the plug portion 34 into contact with the inlet 21b of the second passage member 21.

The second body 32 has on its outer circumferential surface an operational port 32a for guiding compressed air to the pressure chamber P1. The air port connection portion 30b is attached to an outer circumferential surface of the operational port 32a.

In addition, a communicating member 30d is placed such that it is in contact with an inner circumferential surface of the operational pot 32a and an inner circumferential surface of the air port connection portion 30b.

The first body 31 has on its outer circumferential surface an operational port 31a for guiding compressed air to a pressure chamber P2. The air port connection portion 30b is attached to an outer circumferential surface of the operational port 31a.

In addition, a communicating member 30c is placed such that it is in contact with an inner circumferential surface of the operational port 31a and the inner circumferential surface of the air port connection portion 30b.

Figure 9:
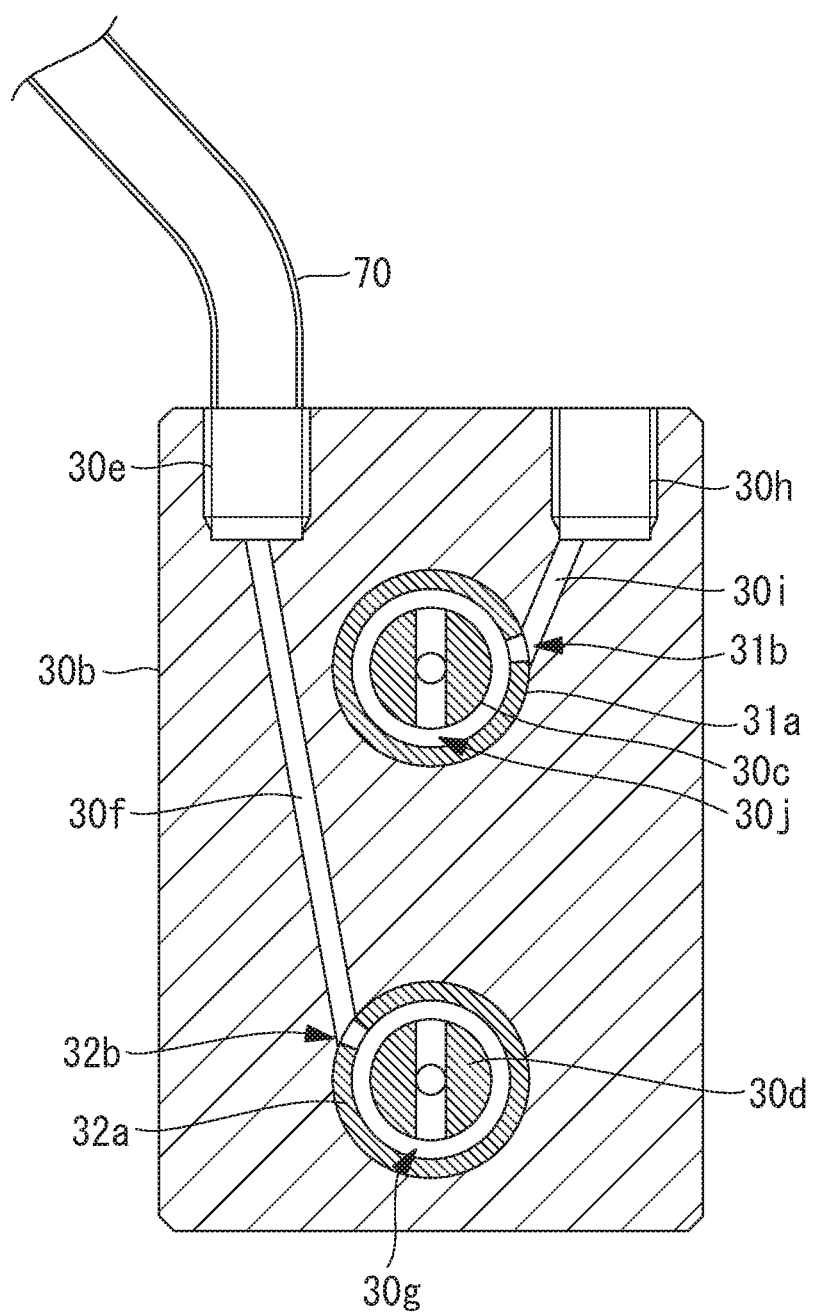
FIG. 9 is an end view of the on/off valve shown in FIG. 7 taken along the line E-E.

As shown in FIG. 9 (an end view of the on/off valve shown in FIG. 7 taken along the line E-E), the air port connection portion 30b has a port portion 30e to receive a compressed air pipe 70 through which compressed air is supplied from the compressed air source (not shown) and a compressed air passage 30f that guides the compressed air from the port portion 30e to an inlet 32b formed on the outer circumferential surface of the operational port 32a.

The compressed air guided into the inlet 32b from the compressed air passage 30f will be guided through an annular passage 30g formed between an outer circumferential surface of the communicating member 30d and the inner circumferential surface of the operational port 32a into a passage formed inside the communicating member 30d and reach the pressure chamber P1.

After reaching the pressure chamber P1, the compressed air exerts a biasing force on the piston portion 33 to move it upward along the axis X. When the biasing force of the compressed air to move the piston portion 33 upward along the axis X exceeds the biasing force of the spring portion 35 to move the piston portion 33 downward along the axis X, the piston portion 33 is moved upward.

The plug portion 34 moves upward with the upward movement of the piston portion 33 to be away from the valve seat of the inlet 21b. Thus, the on/off valve 30 is switched into the inflow state where the fluid enters the second passage 21a through the inlet 21b of the second passage member 21.

While the on/off valve 30 described above is of a normally closed type, which is in shut-off state when the pressure chamber P1 is maintained at atmospheric pressure, it may be a normally open type on/off valve. Hereinafter, a description will be given to a modification where the on/off valve 30 is of a normally open type.

In order to use the on/off valve 30 shown in FIGS. 8 and 9 as a normally open type, the spring portion 35 placed in the pressure chamber P2 will be placed in the pressure chamber P1 and the compressed air pipe 70 connected to the port portion 30e will be connected to a port portion 30h.

The compressed air guided through the port portion 30h into a compressed air passage 30i will be guided into the inlet 31b of the operational port 31a formed on the outer circumferential surface of the first body 31.

The compressed air guided into the inlet 31b will be guided through an annular passage 30j formed between an outer circumferential surface of the communicating member 30c and the inner circumferential surface of the operational port 31a into a passage formed inside the communicating member 30c and reach the pressure chamber P2.

After reaching the pressure chamber P2, the compressed air exerts a biasing force on the piston portion 33 to move it downward along the axis X. When the biasing force of the compressed air to move the piston portion 33 downward along the axis X exceeds the biasing force of the spring portion 35 to move the piston portion 33 upward along the axis X, the piston portion 33 is moved downward.

The plug portion 34 moves downward with the downward movement of the piston portion 33. Thus, the on/off valve 30 is switched into the shut-off state where the fluid does not enter the second passage 21a through the inlet 21b of the second passage member 21.

In this way, in the on/off valve 30 of the embodiment, the spring portion 35 may be placed either in the pressure chamber P1 or in the pressure chamber P2 and the compressed air pipe 70 may be connected either to the port portion 30e or to the port portion 30h.

Thus, the on/off valve 30 of the embodiment is used as a normally closed on/off valve when the spring portion 35 is placed in the pressure chamber P2 and the compressed air pipe 70 is connected to the port portion 30e, and is used as a normally open on/off valve when the spring portion 35 is placed in the pressure chamber P1 and the compressed air pipe 70 is connected to the port portion 30h.

Now, a description will be given to a seal area formed at a coupling position of the on/off valve 30 and the second passage member 21.

As shown in FIG. 8, the on/off valve 30 is coupled to a top surface of the second passage member 21.

The plug portion 34 of the on/off valve 30 has a diaphragm integrated therewith and includes a body portion 34a and a diaphragm portion 34b.

The body portion 34a of the plug portion 34 is formed in a shaft shape extending along the axis X and is capable of contacting an edge portion of the inlet 21b.

The diaphragm portion 34b of the plug portion 34 includes a thin annular inner region that is coupled to the body portion 34a and can be deformed with the movement of the body portion 34a along the axis X and an outer region that is retained interposed between the upper surface of the second passage member 21 and a lower surface of the second body 32.

The diaphragm portion 34b has, at an edge portion of the outer region, an annular protrusion 34c protruding downward along the axis X. The annular protrusion 34c is formed in an endless shape (ring shape) that extends around the axis X.

The annular protrusion 34c is fitted inside an annular recess 21e formed on the upper surface of the second passage member 21.

The annular recess 21e is a groove formed on the upper surface of the second passage member 21 and is formed in an endless shape (ring shape) that extends around the axis X.

An endless (ring shaped) seal area (an edge seal area) is formed as the annular protrusion 34c is inserted into the annular recess 21e. The seal area inhibits outflow of a fluid that enters a space between the second passage member 21 and the outer region of the diaphragm portion 34b from the second passage 21a.

An O ring 21f is placed on the outer peripheral side of the seal area formed by the annular protrusion 34c and the annular recess 21e.

As shown in FIG. 8, the O ring 21f is placed such that its movement in a radial direction orthogonal to the axis X is restricted by the second passage member 21 and the outer region of the diaphragm portion 34b. A seal area is formed as the O ring 21f is placed in contact with both the second passage member 21 and the outer region of the diaphragm portion 34b.

In this way, at the coupling position of the on/off valve 30 and the second passage member 21, there are the seal area formed by the annular protrusion 34c and the annular recess 21e, and in addition, the seal area formed by the O ring 21f, on the outer peripheral side of the former seal area.

Accordingly, even when it is impossible for the annular protrusion 34c and the annular recess 21e to provide a sufficient seal area, such as when the annular protrusion 34c is damaged by replacement of the on/off valve 30 or when the annular protrusion 34c and the annular recess 21e are deformed by a hot fluid, the outflow of the fluid can be reliably inhibited by the seal area formed by the O ring 21f.

Next, a description will be given to a seal area formed at a coupling position of the first passage member 11 and the second passage member 21.

As shown in FIG. 8, an upper surface of the first passage member 11 is coupled to a lower surface of the second passage member 21.

The second passage member 21 has on its lower surface an annular protrusion 21g protruding downward along the axis X. The annular protrusion 21g is formed in an endless shape (ring shape) that extends around the axis X.

The annular protrusion 21g is fitted inside an annular recess 11e formed on the upper surface of the first passage member 11.

The annular recess 11e is a groove formed on the upper surface of the first passage member 11 and is formed in an endless shape (ring shape) that extends around the axis X.

An endless (ring shaped) seal area (edge seal area) is formed as the annular protrusion 21g is inserted into the annular recess 11e. The seal area inhibits outflow of a fluid that enters a space between the upper surface of the first passage member 11 and the lower surface of the second passage member 21 from the first passage 11a.

An O ring 11f is placed on the outer peripheral side of the seal area formed by the annular protrusion 21g and the annular recess 11e.

As shown in FIG. 8, the O ring 11f is placed such that its movement in a radial direction orthogonal to the axis X is restricted by the first passage member 11 and the second passage member 21. A seal area is formed as the O ring 11f is placed in contact with both the first passage member 11 and the second passage member 21.

In this way, at the coupling position of the first passage member 11 and the second passage member 21, there are the seal area formed by the annular protrusion 21g and the annular recess 11e, and in addition, the seal area formed by the O ring 11f, on the outer peripheral side of the former seal area.

Accordingly, even when it is impossible for the annular protrusion 21g and the annular recess 11e to provide a sufficient seal area, such as when the annular protrusion 21g is damaged by replacement of the first passage member 11 or when the annular protrusion 21g and the annular recess 11e are deformed by a hot fluid, the outflow of the fluid can be reliably inhibited by the seal area formed by the O ring 11f.

Here, the radial position of the diaphragm portion 34b where the annular protrusion 34c is formed matches the radial position of the second passage member 21 where the annular protrusion 21g is formed. Similarly, the radial position of the second passage member 21 where the annular recess 21e is formed matches the radial position of the first passage member 11 where the annular recess 11e is formed.

Fastening forces of fastening bolts 90 and 91 to be described later, therefore, will be reliably transferred to both the position where the annular protrusion 34c is fitted inside the annular recess 21e and the position where the annular protrusion 21g is fitted inside the annular recess 11e. This enhances the seal of the seal area at each position.

Next, a description will be given to a structure for removably coupling the first fluid unit 10, the second fluid unit 20, and the on/off valve 30.

Figure 10:
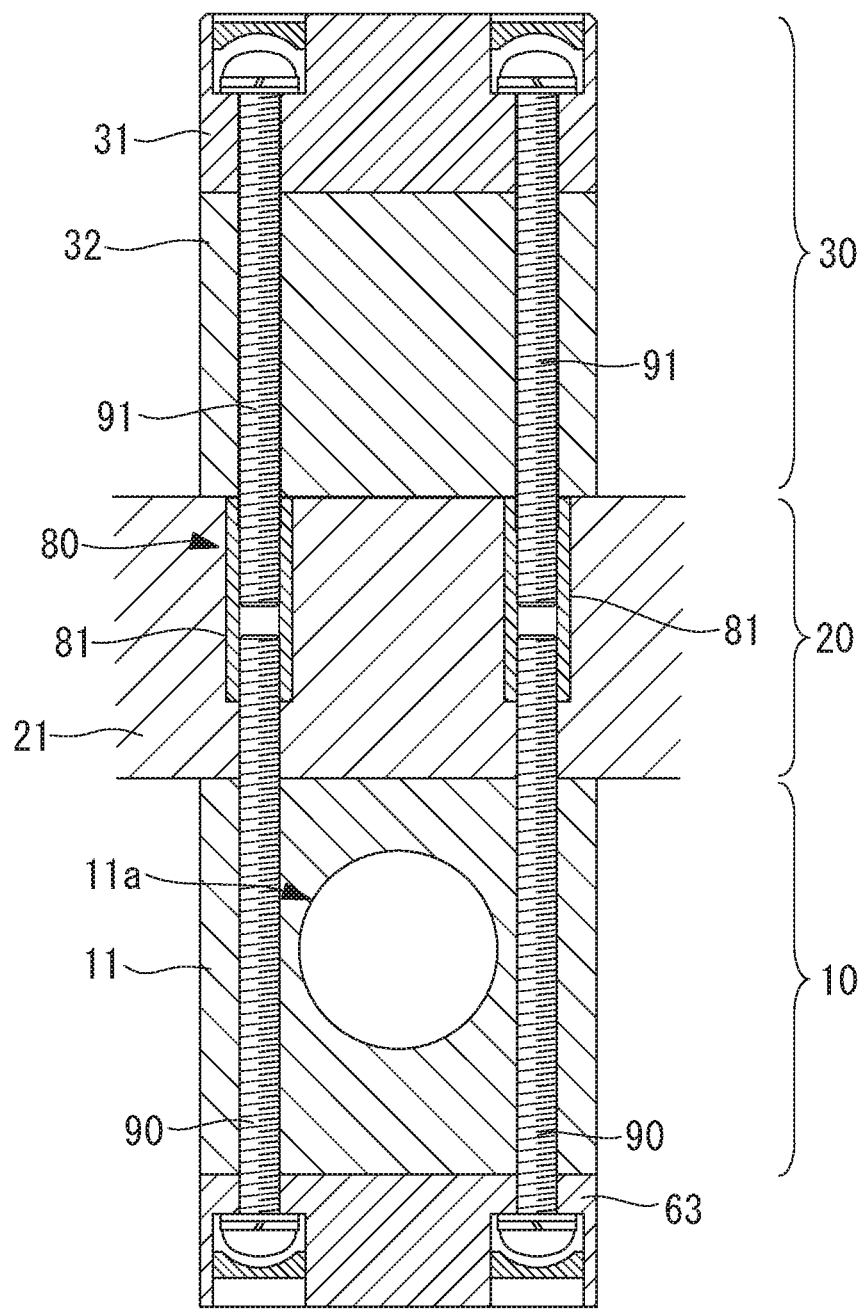
FIG. 10 is a cross-sectional view of the on/off valve shown in FIG. 7 taken along the line D-D.

As shown in FIG. 10 (a cross-sectional view of the on/off valve shown in FIG. 7 taken along the line D-D), the fastening bolts 90 are inserted through through holes formed at four locations (only two locations are shown in FIG. 10) of each of the second base member 63, the first fluid unit 10, and the second fluid unit 20 into lower end sides of four nut portions 81 of the internal thread portion assembly 80.

Also, the fastening bolts 91 are inserted through through holes formed at four locations (only two locations are shown in FIG. 10) of each of the on/off valve 30 and the second fluid unit 20 into upper end sides of the four nut portions 81 of the internal thread portion assembly 80.

Figure 11A:
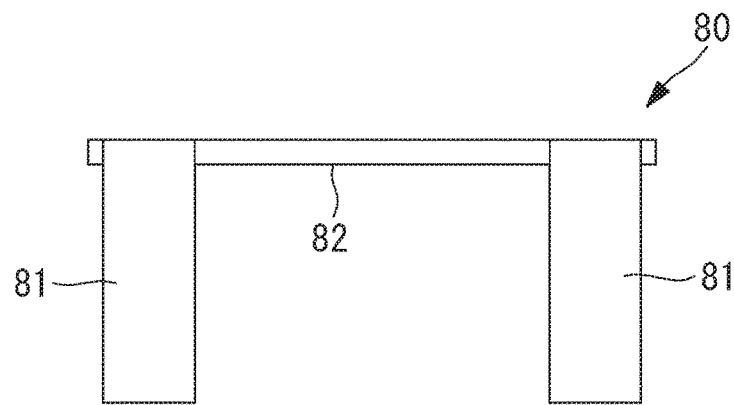
FIG. 11A is a front view of an internal thread portion assembly shown in FIG. 10.
Figure 11B:
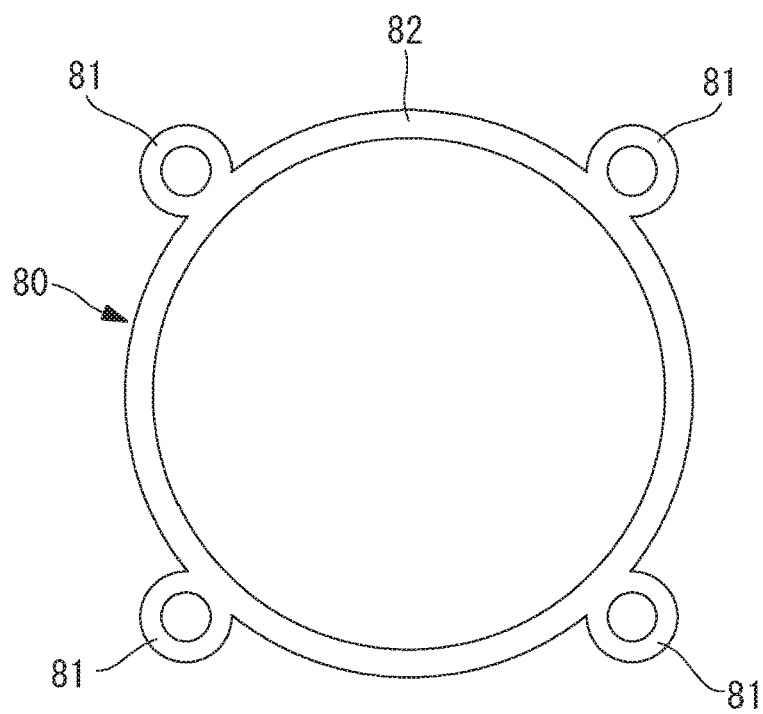
FIG. 11B is a top view of the internal thread portion assembly shown in FIG. 10.

As shown in FIGS. 11A and 11B, the internal thread portion assembly 80 is configured to include an annular shaped annular portion 82 having the cylindrically formed nut portions 81 placed equidistantly (at four locations spaced apart by 90° in FIG. 11B) in the circumferential direction of the annular portion 82. The cylindrically formed nut portions 81 each has internal threads on its inner circumferential surface.

External threads formed on an end of the four fastening bolts 90 (first fastening bolts) inserted from below in FIG. 10 are fastened to the internal threads on lower end sides (one end sides) of the nut portions 81. Meanwhile, external threads formed on an end of the four fastening bolts 91 (second fastening bolts) inserted from above in FIG. 10 are fastened to the internal threads on upper end sides (the other end sides) of the nut portions 81.

The four fastening bolts 90 are inserted from below through the through holes formed in each of the second base member 63, the first passage member 11, and the second passage member 21. Meanwhile, the four fastening bolts 91 are inserted from above the through holes formed in each of the on/off valve 30 and the second passage member 21.

The internal thread portion assembly 80 is formed by integrally molding the nut portion 81 and the annular portion 82. Desirably, the internal thread portion assembly 80 is made from a material that is hardly deformed by the fastening of the fastening bolts 90. Desirably, a metal member such as stainless steel is used as the material for the internal thread portion assembly 80.

Figure 12:
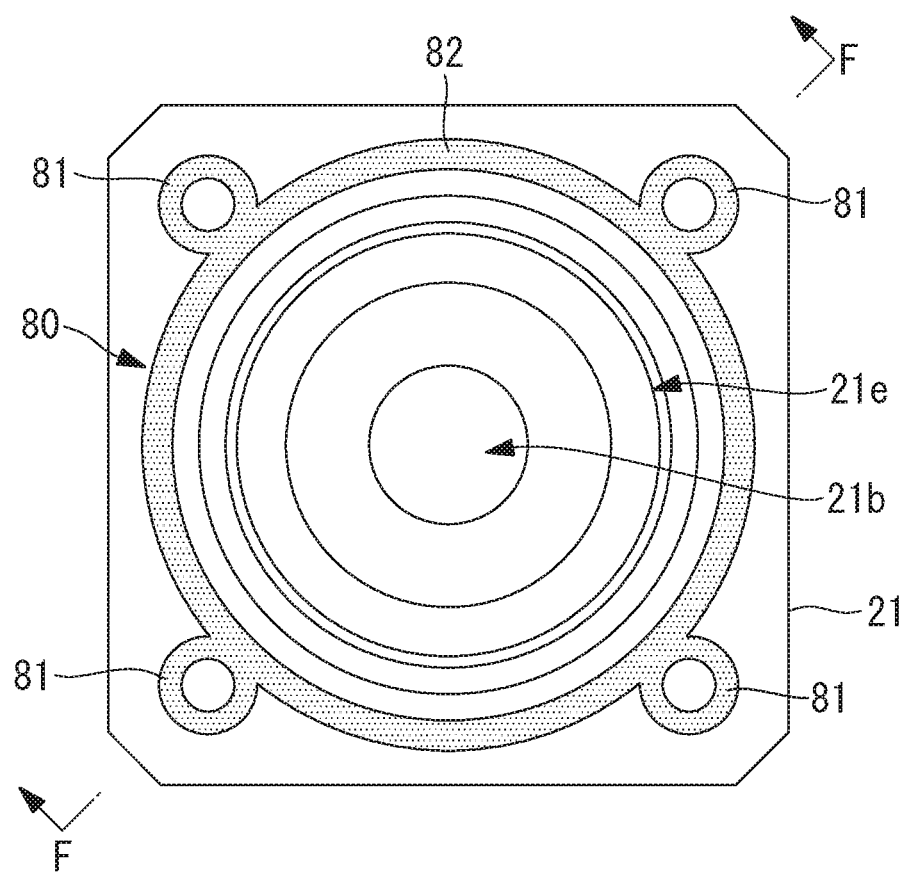
FIG. 12 is a top view of the internal thread portion assembly shown in FIG. 10 attached to a second passage member.

As shown in FIG. 12, the internal thread portion assembly 80 is placed with the annular portion 82 in contact with the upper surface of the second passage member 21 such that the annular portion 82 surrounds the inlet 21b of the second passage member 21.

Figure 13:
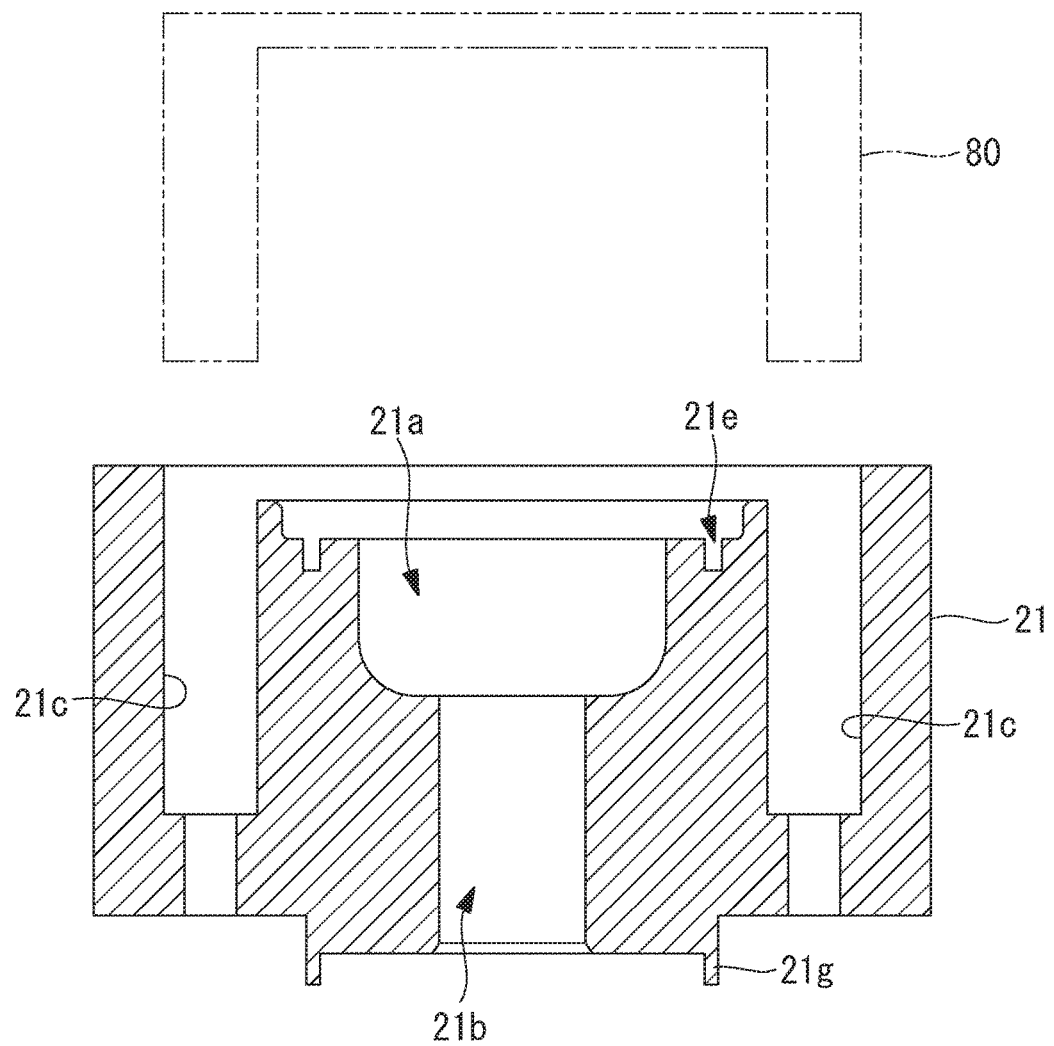
FIG. 13 is a cross-sectional view of the second passage member shown in FIG. 12 taken along the line F-F.

As shown in FIG. 13 (a cross-sectional view of the second passage member shown in FIG. 12 taken along the line F-F), the nut portions 81 of the internal thread portion assembly 80 are inserted into insertion holes 21c formed in the second passage member 21. The insertion holes 21c are formed to open to the upper surface of the second passage member 21.

In this way, the internal thread portion assembly 80 is attached to the second passage member 21 with the annular portion 82 in contact with the upper surface of the second passage member 21 for the entire circumference of the annular portion 82, and with the nut portions 81 fitted inside the insertion holes 21c of the second passage member 21.

Accordingly, the fastening force of the four fastening bolts 90 that are inserted from below the second passage member 21 and fastened to the nut portions 81 will be transferred to the upper surface of the second passage member 21 via the entire circumference of the annular portion 82. This suppresses an occurrence of a strain on the upper surface of the second passage member 21 even if there are differences among the fastening forces of the four fastening bolts 90 as compared with the case where no annular portion 82 is provided.

Similarly, the fastening force of the four fastening bolts 91 that are inserted from above the second passage member 21 and fastened to the nut portions 81 will be transferred to the lower surface of the on/off valve 30 via the entire circumference of the annular portion 82. This suppresses an occurrence of a strain on a lower surface of the on/off valve 30 even if there are differences among the fastening forces of the four fastening bolts 91 as compared with the case where no annular portion 82 is provided.

Thus, the use of the internal thread portion assembly 80 suppresses an occurrence of a strain on the upper surfaces of the second passage members 21 to 25 and the lower surface of the on/off valve 30. This enhances the sealing performance at the coupling positions of the first passage members 11 to 16 and the second passage members 21 to 25 and the sealing performance at the coupling positions of the second passage members 21 to 25 and the on/off valves 30.

While the internal thread portion assembly 80 is inserted into the insertion holes 21c that open to the upper surface of the second passage member 21 in the foregoing description, the coupling structure may be configured otherwise.

For example, the insertion holes 21c may be formed to open to the lower surface of the second passage member 21 to receive the internal thread portion assembly 80 from below the second passage member 21.

In that case, the internal thread portion assembly 80 is attached to the second passage member 21 with the annular portion 82 in contact with the lower surface of the second passage member 21 for the entire circumference of the annular portion 82, and with the nut portions 81 fitted inside the insertion holes 21c of the second passage member 21.

Also, the fastening force of the four fastening bolts 91 that are inserted from above the second passage member 21 and fastened to the nut portions 81 will be transferred to the lower surface of the second passage member 21 via the entire circumference of the annular portion 82. This configuration suppresses an occurrence of a strain on the lower surface of the second passage member 21 even if there are differences among the fastening forces of the four fastening bolts 91 as compared with the case where no annular portion 82 is provided.

Similarly, the fastening force of the four fastening bolts 90 that are inserted from below the second passage member 21 and fastened to the nut portions 81 will be transferred to the upper surface of the first passage member 11 via the entire circumference of the annular portion 82. This suppresses an occurrence of a strain on the upper surface of the first passage member 11 even if there are differences among the fastening forces of the four fastening bolts 90 as compared with the case where no annular portion 82 is provided.

As described above, the first fluid unit 10, the second fluid unit 20, and the on/off valve 30 are removably coupled to each other by the internal thread portion assembly 80 and the fastening bolts 90 and 91.

Specifically, the first passage members 11 to 16 and the drain passage member 17 of the first fluid unit 10 are removably coupled to the second base members 63 placed below and the second passage members 21 to 25 placed above. The second passage members 21 to 25 of the second fluid unit 20 are removably coupled to the on/off valves 30 placed above, and the first passage members 11 to 16 and the drain passage member 17 placed below. Each of the plurality of on/off valves 30 is removably coupled to the second passage members 21 to 25 placed below.

Accordingly, these components enter coupled state where they are coupled together as the fastening bolts 90 and 91 are fastened to the internal thread portion assembly 80, and enter separated state where they are uncoupled as the fastening bolts 90 and 91 are removed from the internal thread portion assembly 80. The first fluid unit 10, the second fluid unit 20, and the on/off valves 30, therefore, can be replaced separately.

Figure 14:
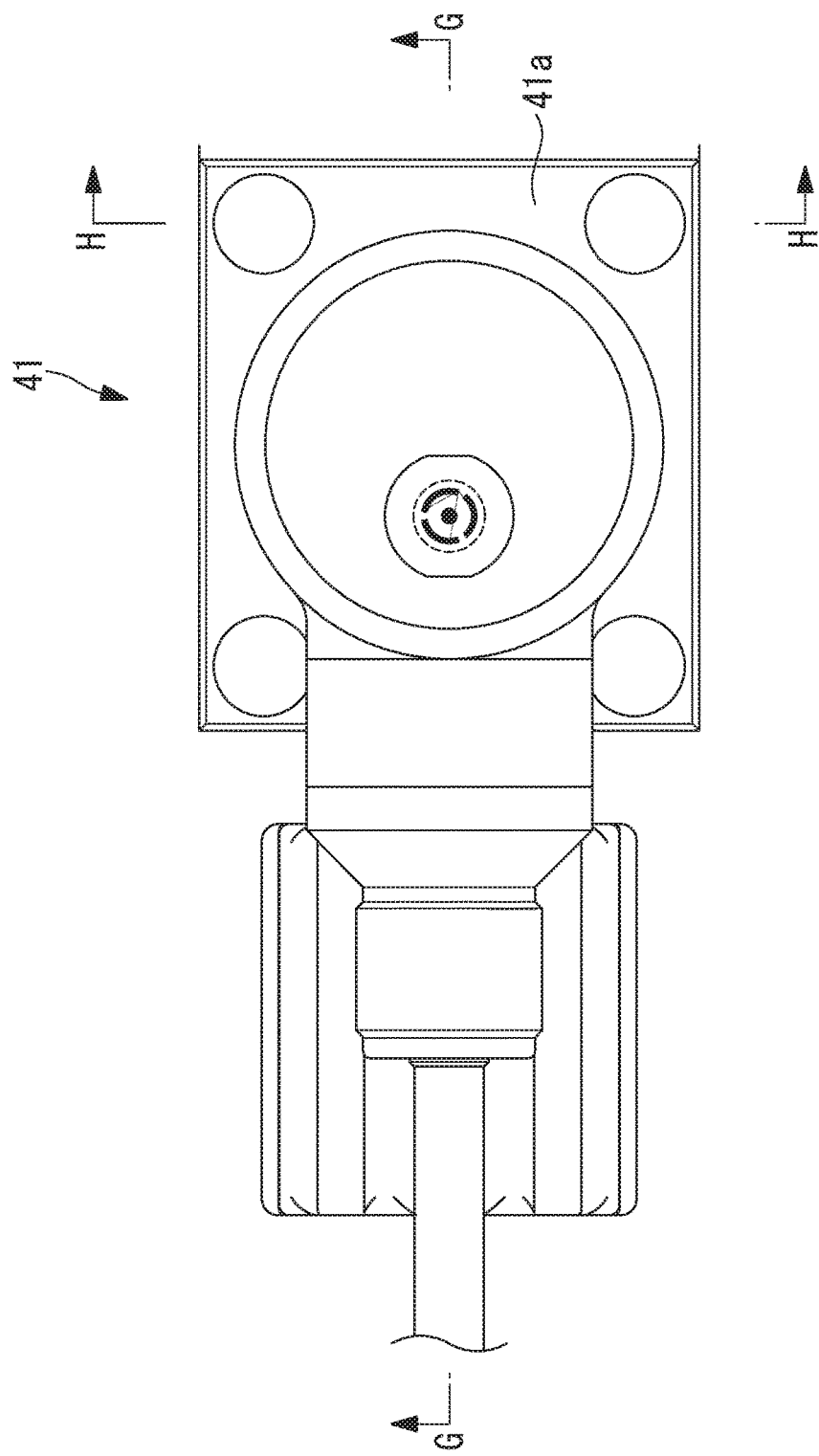
FIG. 14 is a top view of a pressure sensor shown in FIG. 1.
Figure 15:
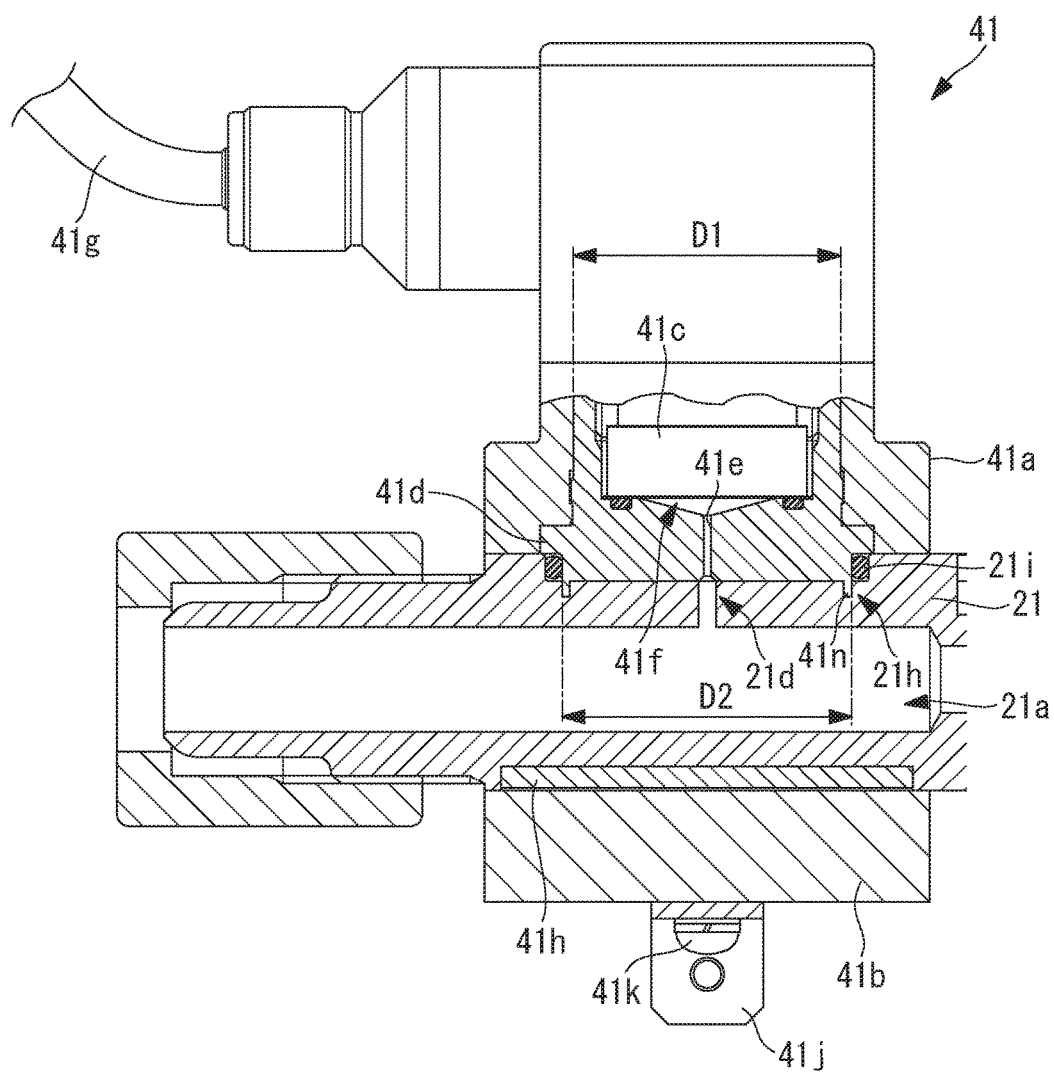
FIG. 15 is a partial cross-sectional view of the pressure sensor shown in FIG. 14 taken along the line G-G.

Next, a description will be given to the pressure sensors 41 to 45 respectively attached to the destination side end portions of the second passage members 21 to 25. FIG. 14 is a top view of the pressure sensor 41 shown in FIG. 1. FIG. 15 is a partial cross-sectional view of the pressure sensor shown in FIG. 14 taken along the line G-G. The pressure sensor 41 will be described in the following description while omitting descriptions on the other pressure sensors 42 to 45, which are similar to the pressure sensor 41.

As shown in FIG. 15, the pressure sensor 41 includes a first body 41a, a second body 41b, a pressure detecting element 41c, a fluid introducing member 41d, a plate 41h, and an earth plate 41j.

As shown in FIGS. 14 to 17, the first body 41a and the second body 41b each have an approximately square shape in a plan view. The first body 41a has through holes that allow fastening bolts 41i (refer to FIG. 16) to penetrate therethrough at the four corners in a plan view, and the second body 41b has insertion holes to receive the fastening bolts 41i.

Figure 16:
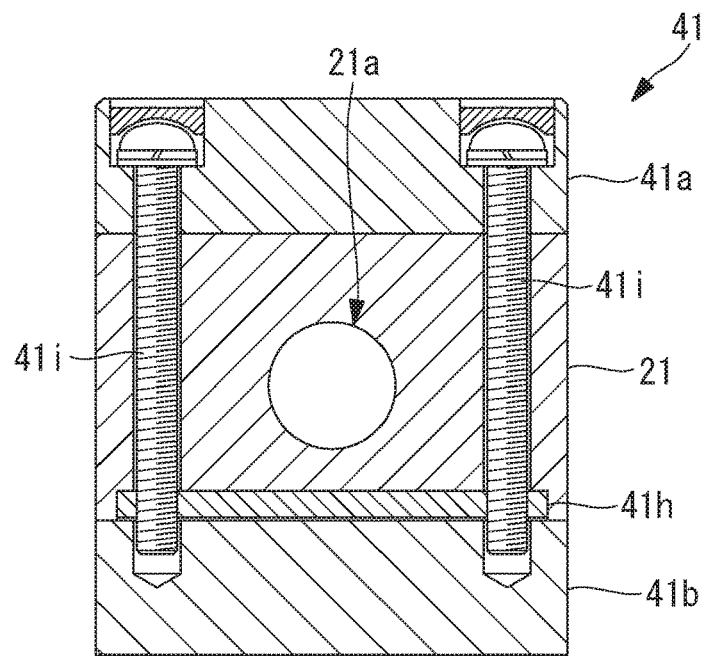
FIG. 16 is a cross-sectional view of the pressure sensor shown in FIG. 14 taken along the line H-H.

As shown in FIG. 16, the first body 41a is fixed to the plate 41h with the second passage member 21 interposed therebetween as the fastening bolts 41i inserted through the through holes of the first body 41a and the through holes of the second passage member 21 are fastened to fastening holes of the plate 41h.

The plate 41h and the fastening bolts 41i are each made of metal, so that static electricity generated by flow of the fluid within the second passage 21a of the second passage member 21 is conducted through the fastening bolts 41i to the plate 41h.

In this way, the pressure sensor 41 can be fixed to the second passage member 21 by fastening the fastening bolts 41i to the plate 41h, and can be released from the second passage member 21 by loosening the fastening bolts 41i. Because the pressure sensor 41 can be mounted to and removed from the second passage member 21 by using the four fastening bolts 41i, and it can be easily repaired in case of failure.

Figure 17:
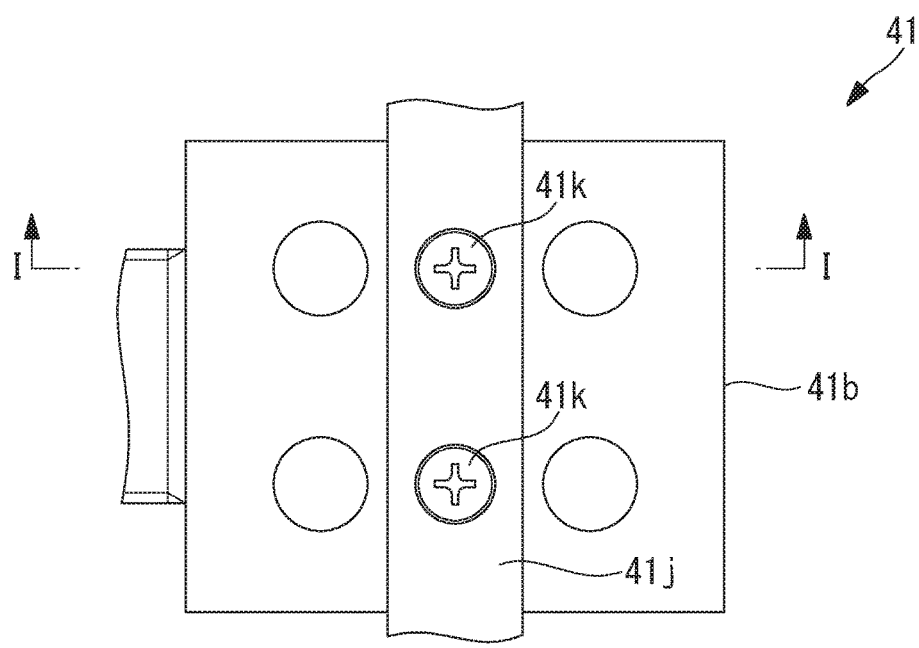
FIG. 17 is a bottom view of the pressure sensor shown in FIG. 14.
Figure 18:
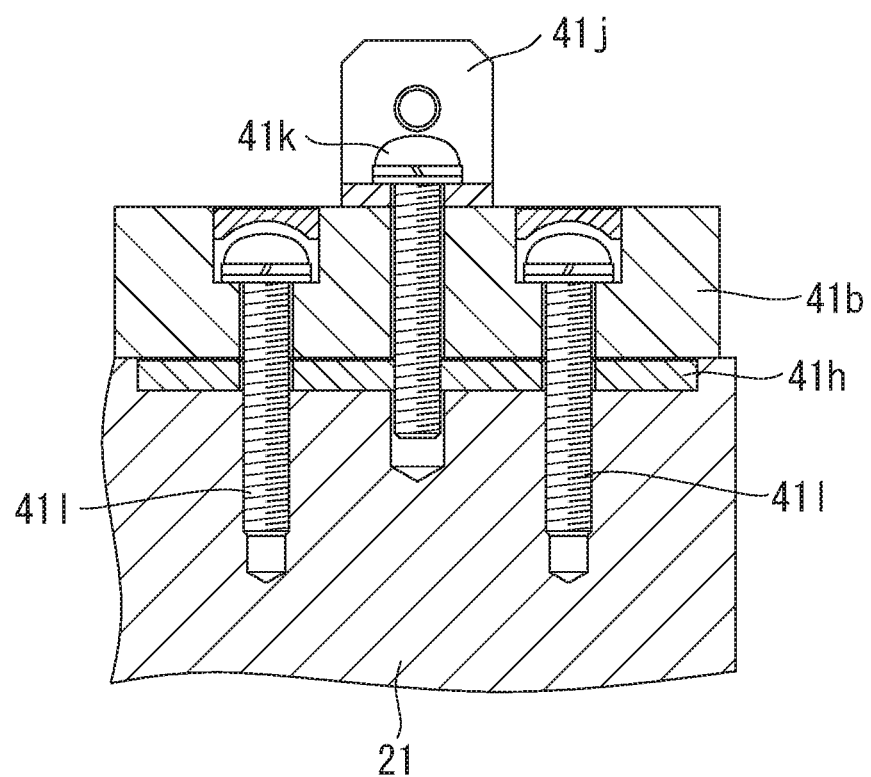
FIG. 18 is a partial cross-sectional view of the pressure sensor shown in FIG. 17 taken along the line I-I.

As shown in FIGS. 17 and 18, the second body 41b is fixed to the second passage member 21 with the plate 41h interposed therebetween as the fastening bolts 41l inserted through through holes of the second body 41b are fastened to fastening holes of the second passage member 21.

As described above, the plate 41h is fixed interposed between the second body 41b and the second passage member 21 by the fastening bolts 41l, regardless of the fastening state of the fastening bolts 41i. As a result, the plate 41h never falls off even when the fastening bolts 41i are removed from the plate 41h for replacing the pressure sensor 41.

As shown in FIG. 18, the earth plate 41j is fixed to the plate 41h with the second body 41b interposed therebetween as a fastening bolt 41k inserted through a through hole of the earth plate 41j and a through hole of the second body 41b is fastened to a fastening hole of the plate 41h.

The plate 41*h*, the fastening bolts 41*k*, and the earth plate 41*j* are each made of metal, and thus the plate 41*h* is in electrical communication with the earth plate 41*j*. Thus, the static electricity generated in the second passage member 21 and conducted to the plate 41*h* will be conducted to the earth plate 41*j*.

The earth plate 41*j* is grounded through a grounding terminal (not shown), so that the static electricity conducted to the earth plate 41*j* will be discharged to the outside.

In this way, the static electricity generated in the second passage member 21 is conducted from the fastening bolt 41*l* to the plate 41*h*, from the plate 41*h* to the fastening bolt 41*k*, from the fastening bolt 41*k* to the earth plate 41*j*, and finally discharged to the outside.

This prevents malfunction or failure of the pressure detecting element 41*c* of the pressure sensor 41 that would be otherwise caused by the static electricity generated in the second passage member 21.

As shown in FIG. 15, the first body 41*a* includes the pressure detecting element 41*c* and the fluid introducing member 41*d* that are placed inside.

The fluid introducing member 41*d* has inside an introduction passage 41*e* that guides a fluid exiting through the outlet 21*d* communicating with the second passage 21*a* of the second passage member 21, into a pressure detecting chamber 41*f*.

The fluid that is guided from the outlet 21*d* to the introduction passage 41*e* will be guided into the pressure detecting chamber 41*f* formed between the pressure detecting element 41*c* and an upper surface of the fluid introducing member 41*d*.

The pressure detecting element 41*c* is an element that outputs a detection signal in accordance with the pressure of a fluid that is guided through the introduction passage 41*e* into the pressure detecting chamber 41*f*. The pressure sensor 41 transmits the detection signal detected by the pressure detecting element 41*c* through a signal wire in the cable 41*g* to the controller 50.

As shown in FIG. 15, a flow path diameter of the introduction passage 41*e* is sufficiently smaller than that of the second passage 21*a* in the second passage member 21. The flow path diameter of the introduction passage 41*e* is desirably set to 0.5 mm or more and 5 mm or less. Specifically, it is desirable to set to 0.5 mm or more and 2 mm or less.

The sufficiently small flow path diameter of the introduction passage 41*e* makes it unlikely that a large pressure fluctuation (a water hammer) of a fluid within the second passage 21*a*, if happens, is transferred to the pressure detecting chamber 41*f* because the pressure is reduced within the introduction passage 41*e*. This inhibits the pressure detecting element 41*c* from being damaged by a large pressure fluctuation of the fluid within the second passage 21*a*.

In addition, the sufficiently small flow path diameter of the introduction passage 41*e* ensures sufficient flow path length relative to the fluid flow within the introduction passage 41*e*. Accordingly, even when the fluid that is introduced into the introduction passage 41*e* is rapidly increased in temperature, the fluid is sufficiently reduced in temperature before reaching the pressure detecting element 41*c* from the second passage 21*a*, for example. As a result, even when the fluid that is introduced into the introduction passage 41*e* is rapidly changed in temperature, the introduction passage 41*e* inhibits the detection value of the pressure detecting element 41*c* from being erroneously measured due to the temperature changes.

The pressure sensor 41 in FIG. 15 is configured such that the pressure detecting element 41*c* is not exposed to the outside but protected by the fluid introducing member 41*d* when the first body 41*a* is removed from the second passage member 21.

This inhibits the pressure detecting element 41*c* from being damaged in mounting the pressure sensor 41.

Next, a seal area formed at a coupling position of the pressure sensor 41 and the second passage member 21.

As shown in FIG. 15, the upper surface of the second passage member 21 is coupled to the lower surface of the fluid introducing member 41*d* of the pressure sensor 41.

The fluid introducing member 41*d* has on a lower surface an annular protrusion 41*n* protruding downward and extending endlessly (in a ring shape).

The annular protrusion 41*n* is fitted inside an annular recess 21*h* formed on the upper surface of the second passage member 21.

The annular recess 21*h* is a groove formed on the upper surface of the second passage member 21 and is formed endlessly (in a ring shape).

An endless (ring shaped) seal area (edge seal area) is formed as the annular protrusion 41*n* is inserted into the annular recess 21*h*. The seal area inhibits outflow of a fluid that enters a space between the upper surface of the second passage member 21 and the lower surface of the fluid introducing member 41*d* from the outlet 21*d*.

An O ring 21*i* is placed on the outer peripheral side of the seal area formed by the annular protrusion 41*n* and the annular recess 21*h*.

As shown in FIG. 15, the O ring 21*i* is placed such that its radial movement is restricted by the second passage member 21 and the fluid introducing member 41*d*. A seal area is formed as the O ring 21*i* is placed in contact with both the second passage member 21 and the fluid introducing member 41*d*.

In this way, at the coupling position of the second passage member 21 and the fluid introducing member 41*d*, there are the seal area formed by the annular protrusion 41*n* and the annular recess 21*h*, and in addition, the seal area formed by the O ring 21*i*, on the outer peripheral side of the former seal area.

Accordingly, even when it is impossible for the annular protrusion 41*n* and the annular recess 21*h* to provide a sufficient seal area, such as when the annular protrusion 41*n* is damaged by replacement of the pressure sensor 41 or when the annular protrusion 41*n* and the annular recess 21*h* are deformed by a hot fluid, the outflow of the fluid can be reliably inhibited by the seal area formed by the O ring 21*i*.

A material for the first body 41*a* (e.g., polyvinylidene fluoride (PVDF)) is stronger than a material for the fluid introducing member 41*d* (e.g., polytetrafluoroethylene (PTFE)).

As shown in FIG. 15, an inner diameter D1 of the first body 41*a* is smaller than an outer diameter D2 of the annular protrusion 41*n*.

Thus, the fastening force of the fastening bolts 41*i* to fasten the first body 41*a* to the plate 41*h* is reliably transferred from the first body 41*a* to the annular protrusion 41*n*. This enhances the seal of the seal area formed by the annular protrusion 41*n* and the annular recess 21*h*.

Next, a description will be given to forming the pressure sensor 41 as an integral structure to improve workability in replacing the pressure sensor 41.

The first body 41*a* and the fluid introducing member 41*d* shown in FIG. 15 are formed to be integral with each other as a protrusion formed on an outer circumferential surface of the fluid introducing member 41d is fitted (driven) into a groove formed on an inner circumferential surface of the first body 41a.

In addition, the other members of the pressure sensor 41 placed above the first body 41a and the fluid introducing member 41d are made integral with the first body 41a and the fluid introducing member 41d.

Accordingly, in mounting the pressure sensor 41 onto the upper surface of the second passage member 21, the integrated structural member is just placed on the upper surface of the second passage member 21.

The pressure sensor 41 of the embodiment, therefore, can be mounted onto the second passage member 21 by simple operations of placing the integrated structural member on the upper surface of the second passage member 21 and fastening these members with the second passage member 21 interposed between these members and the second body 41b.

As described above, according to the fluidic device 100 of the embodiment, the plurality of on/off valves 30 placed at the plurality of points $P_{11}$ to $P_{56}$ where the first passage members 11 to 16 of the first fluid unit 10 intersect with the second passage members 21 to 25 of the second fluid unit 20 switch the flow states of the fluids from the first passages 11a to 16a to the second passages 21a to 25a at their respective points.

Thus, the fluidic device 100 of the embodiment can supply a desired one of the fluids from the plurality of supply sources IN1 to IN6 to each of the plurality of destinations OUT1 to OUT5 by appropriately switching the on/off valves 30 between open and closed states.

In the fluidic device 100 of the embodiment, the first fluid unit 10 for passing the fluids from the plurality of supply sources is separate from the second fluid unit 20 for supplying the fluids to the plurality of destinations, and these units are removably coupled to each other. When either one of the first fluid unit 10 or the second fluid unit 20 needs to be replaced, therefore, only one fluid unit that needs to be replaced can be replaced while using the other fluid unit without replacement. Moreover, in replacing one fluid unit, piping and other components attached to the other fluid unit that is not replaced is not required to be removed.

Thus, according to the embodiment, the first fluid unit 10 having the passages for passing the fluids from the plurality of supply sources and the second fluid unit 20 having the passages for supplying the fluids to the plurality of destinations can be replaced separately, thereby reducing the labor and the costs for the replacement.

In the fluidic device 100 of the embodiment, the first fluid unit 10 includes the first passage members 11 to 16 each having the corresponding one of the first passages 11a to 16a and the second fluid unit 20 includes the second passage members 21 to 25 each having the corresponding one of the second passages 21a to 25a.

Accordingly, the first passage member including one of the plurality of first passages 11a to 16a of the first fluid unit 10 that needs to be replaced may be replaced alone, while using the other first passage members without replacement. Similarly, the second passage member including one of the plurality of second passages 21a to 25a of the second fluid unit 20 that needs to be replaced may be replaced alone, while using the other second passage members without replacement.

This makes it possible for the one passage member including the passage that needs to be replaced to be replaced alone, thereby reducing the labor and the costs for the replacement.

According to the fluidic device 100 of the embodiment, the fastening force between the plurality of nut portions 81 of the internal thread portion assembly 80 and the fastening bolts 90 is transferred to adjacent members via the annular portion 82, and the fastening force between the plurality of nut portions 81 and the fastening bolts 91 is transferred to adjacent members via the annular portion 82.

The annular portion 82 is in contact with the upper or lower surface of the second passage member 21 to 25 for the entire circumference of the annular portion 82, so that this suppresses an occurrence of a strain at the members adjacent to the annular portion 82 even if there are differences among the fastening forces between the plurality of nut portions 81 and the plurality of fastening bolts 90 or between the plurality of nut portions 81 and the plurality of fastening bolts 91.

This enhances the sealing performance at the coupling positions of the first passage members 11 to 16 and the second passage members 21 to 25, and also the sealing performance at the coupling positions of the second passage members 21 to 25 and the on/off valves 30.

OTHER EMBODIMENTS

While in the above description, the first fluid unit 10 includes the plurality of first passage members 11 to 16 independent from each other and the second fluid unit 20 includes the plurality of second passage members 21 to 25 independent from each other, the present disclosure may have other aspects.

For example, the first fluid unit 10 may be formed from a single member integrally formed from the plurality of first passage members 11 to 16 and the drain passage member 17, and the second fluid unit 20 may be formed from a single member integrally formed from the plurality of second passage members 21 to 25.

In that case, the fluidic device 100 has a three-layer structure that includes the first fluid unit 10 arranged on the bottom, the second fluid unit 20 arranged over the first fluid unit 10, and the on/off valves 30 attached on the top.

According to this aspect, when either one of the first fluid unit 10 or the second fluid unit 20 needs to be replaced, only one fluid unit that needs to be replaced can be replaced while using the other fluid unit without replacement. Moreover, in replacing the one fluid unit, piping and other components attached to the other fluid unit that is not replaced is not required to be removed.

While in the above description, the drain ports 17c and 17d of the drain passage member 17 are connected to the vacuum source to discharge the fluid remaining inside the second passages 21a to 25a to the outside through the drain ports 17c and 17d, the present disclosure may have other aspects.

For example, the drain ports 17c and 17d of the drain passage member 17 may be configured as purge ports 17'c and 17'd of a purge passage member 17', respectively. In that case, the purge ports 17'c and 17'd are connected to a pressurization source (e.g., a nitrogen gas supply source), the inside of the second passages 21a to 25a are pressurized, and the fluid remaining inside the second passages 21a to 25a are discharged toward the destinations. In that case, it is desirable to wash the inside of the second passages 21a to 25a with, for example, pure water before discharging the fluids remaining inside the second passages 21a to 25a toward the destinations.

In addition, the present invention is not limited to the foregoing embodiment, and modifications may be made as appropriate without departing from the scope of the present invention.

The invention claimed is:

1. A fluidic device comprising:
a first fluid unit having a plurality of first passages for passing fluids from a plurality of supply sources each along a first direction;
a second fluid unit having a plurality of second passages for passing the fluids along a second direction intersecting the first direction and supplying the fluids to a plurality of destinations; and
a plurality of on/off valves placed at a plurality of intersecting points, one at each intersecting point, where the first passages and the second passages intersect with each other, the on/off valves switching flow states of the fluids from the first passages to the second passages,
wherein the first fluid unit and the second fluid unit are removably coupled to each other such that outlets formed at a plurality of locations of the first passages are coupled to inlets formed at a plurality of locations of the second passages at each of the intersecting points,
wherein the first fluid unit includes a drain passage which intersects the plurality of second passages, and
wherein a flow path diameter of the drain passage is smaller than a flow path diameter of the plurality of first passages.

2. The fluidic device according to claim 1, wherein
the first fluid unit includes a plurality of first passage members each having one of the first passages, and
the second fluid unit includes a plurality of second passage members each having one of the second passages.

3. The fluidic device according to claim 2, further comprising an assembly including an annular shaped annular portion and a plurality of nut portions spaced along a circumferential direction of the annular portion,
wherein the plurality of nut portions are inserted into insertion holes opening on an upper surface or a lower surface of the corresponding second passage member,
a plurality of first fastening bolts are fastened to one end sides of the nut portions, the first fastening bolts being inserted through through holes formed at each of the corresponding first passage member and the corresponding second passage member, and
a plurality of second fastening bolts are fastened to the other end sides of the nut portions, the second fastening bolts being inserted through through holes formed at each of the corresponding on/off valve and the corresponding second passage member.

4. The fluidic device according to claim 2, further comprising a plurality of pressure sensors mounted on destination side end portions of the plurality of second passage members, one on each destination side end portion, the pressure sensors each detecting a pressure of a fluid supplied from the corresponding second passage to the corresponding destination.

5. The fluidic device according to claim 3, further comprising a plurality of pressure sensors mounted on destination side end portions of the plurality of second passage members, one on each destination side end portion, the pressure sensors each detecting a pressure of a fluid supplied from the corresponding second passage to the corresponding destination.

6. The fluidic device according to claim 2, wherein the outlets of the first passages and the inlets of the second passages are directly coupled together at the intersecting points.

* * * * *